US006856219B2

(12) United States Patent
Kawai

(10) Patent No.: US 6,856,219 B2
(45) Date of Patent: Feb. 15, 2005

(54) ELECTROSTATIC ACTUATOR

(75) Inventor: Hiroshi Kawai, Yokohama (JP)

(73) Assignee: Murata Manufacturing Co., Ltd., Kyoto (JP)

(*) Notice: Subject to any disclaimer, the term of this patent is extended or adjusted under 35 U.S.C. 154(b) by 140 days.

(21) Appl. No.: 10/349,807

(22) Filed: Jan. 22, 2003

(65) Prior Publication Data

US 2003/0155221 A1 Aug. 21, 2003

(30) Foreign Application Priority Data

Jan. 23, 2002 (JP) ........................................ 2002-014759

(51) Int. Cl.[7] .............................................. H01H 51/22
(52) U.S. Cl. ........................................ 335/78; 200/181
(58) Field of Search ............................. 335/78; 200/181

(56) References Cited

U.S. PATENT DOCUMENTS

| 5,475,353 A | * | 12/1995 | Roshen et al. | ................. | 335/78 |
| 5,479,042 A | * | 12/1995 | James et al. | ................. | 257/415 |
| 5,620,933 A | * | 4/1997 | James et al. | ..................... | 216/2 |
| 6,307,452 B1 | * | 10/2001 | Sun | ........................... | 333/262 |
| 6,504,118 B2 | * | 1/2003 | Hyman et al. | ............... | 200/181 |
| 6,713,695 B2 | * | 3/2004 | Kawai et al. | ................ | 200/181 |
| 2003/0227361 A1 | * | 12/2003 | Dickens et al. | ................ | 335/78 |
| 2004/0155736 A1 | * | 8/2004 | Song et al. | .................... | 335/78 |

* cited by examiner

*Primary Examiner*—Lincoln Donovan
*Assistant Examiner*—Bernard Rojas
(74) *Attorney, Agent, or Firm*—Keating & Bennett, LLP

(57) ABSTRACT

An electrostatic actuator includes a movable member that is connected to a movable member securing section through a movable connection beam so that the movable member can be displaced in the x-axis direction. Drive electrode supporting sections are connected to drive electrode securing sections through driving connection beams so that they can move towards and away from each other. Gap sizes a, b, and c between first movable electrodes to third movable electrodes and respective first drive electrodes to third drive electrodes are successively larger. When the actuator operates, the movable member is displaced in a plurality of stages by electrostatic forces successively produced between the first movable electrode and the first drive electrode, the second movable electrode and the second drive electrode, and the third movable electrode and the third drive electrode. As a result, it is possible for the movable member to have high rigidity (resonant frequency) and to move stably, so that its amount of displacement is very large. By successively displacing the movable member via the plurality of drive electrodes, the movable member has very high rigidity and is greatly displaced, so that the performance of the actuator is greatly improved.

6 Claims, 23 Drawing Sheets

ELECTROSTATIC ACTUATOR

BACKGROUND OF THE INVENTION

1. Field of the Invention

The present invention relates to an electrostatic actuator suitable for use in, for example, driving a movable member, which is disposed at a substrate, by electrostatic forces generated between electrodes.

2. Description of the Related Art

In general, various types of very small actuators can be formed at, for example, a silicon substrate by, for example, micromachining. Of the various types of very small actuators, the type that uses electrostatic forces can be easily processed in addition to easily providing drive forces even when it is small, so that this type of actuator is widely used as an electrostatic actuator.

An electrostatic actuator which is manufactured using a first related technology is known to have a structure in which, for example, a flat electrode is formed above a substrate with a gap therebetween and is displaced in a direction that is perpendicular to the substrate by applying a voltage to the electrode.

An electrostatic actuator which is manufactured using a second related technology has a structure in which two comb-shaped electrodes, a movable electrode and a stationary electrode, are engaged, and the movable electrode is displaced with respect to the stationary electrode in the direction of extension of the electrode fingers by applying a voltage between the electrodes.

An electrostatic actuator which is manufactured using a third related technology has a structure which is disclosed in, for example, Japanese Unexamined Patent Application Publication No. 5-21976, in which a plurality of electrodes are connected and arranged in the form of an accordion, and the electrodes arranged in the form of an accordion are displaced by being extended and contracted by applying a voltage between a stationary electrode and the electrodes arranged in the form of an accordion.

In the first related technology, since a sufficient electrostatic force is provided by providing the gap between the flat electrode and the substrate small, the amount of displacement of the electrode is limited to a small value due to the size of the gap, so that it becomes difficult to realize an actuator which needs to be greatly displaced. Thus, the scope of application and number of applications are limited.

In the second related technology, the gap between the two electrodes that engage each other is limited by, for example, the processing precision, so that it is difficult to generate a large electrostatic force between the electrodes. Therefore, in order to easily displace the movable electrode even by a small electrostatic force, it is necessary to set, for example, the spring constant of a beam supporting the movable electrode to have a small value. Therefore, the rigidity of a movable member including the electrode tends to be small, so that it is difficult to realize an actuator which has a required, sufficiently high rigidity.

In the third related technology, since the electrodes arranged in the form of an accordion extend and contract as a whole, there is a limit as to how large the rigidity of the electrodes can be, so that this technology has the same problem as the second related technology. In addition, since individual members which are bent in the form of an accordion extend and contract, respectively, it is difficult to achieve a suitable amount of displacement for the electrodes as a whole.

SUMMARY OF THE INVENTION

In order to overcome the problems described above, preferred embodiments of the present invention provide an electrostatic actuator which makes it possible to produce a sufficient electrostatic force between a movable electrode and a drive electrode to stably drive and greatly displace a movable member, and to make it possible for the movable member to have sufficient rigidity when necessary.

According to a first preferred embodiment of the present invention, an electrostatic actuator includes a substrate, a movable member securing section disposed at the substrate, a movable member that is spaced from the substrate, a movable connection beam which connects the movable member to the movable member securing section so that the movable member is displaceable towards and away from the movable member securing section, a plurality of movable electrodes which are disposed at the movable member and spaced from each other in a direction in which the movable member is displaced, a drive electrode securing section disposed at the substrate, at least one drive electrode supporting section aligned with the drive electrode securing section in the direction in which the movable member is displaced, a plurality of driving connection beams which connect the drive electrode securing section and the at least one drive electrode supporting section or the drive electrode securing section and the at least one drive electrode supporting section and adjacent drive electrode supporting sections so that the drive electrode securing section and the at least one drive electrode supporting section or the drive electrode securing section and the at least one drive electrode supporting section and the adjacent drive electrode supporting sections are displaceable towards and away from each other, and a plurality of drive electrodes disposed at the drive electrode securing section and the at least one drive electrode supporting section, the plurality of drive electrodes opposing the respective movable electrodes with gaps therebetween in the direction in which the movable member is displaced.

With this structure, it is possible to apply a voltage between the movable electrodes and the respective drive electrodes that oppose each other in order to generate electrostatic forces between the movable electrodes and the respective drive electrodes. In addition, after driving the movable member by the electrostatic forces generated between the movable electrode and the drive electrode of one set, the movable member can be further driven by the electrostatic forces generated between the movable electrode and the drive electrode of the next set, so that the movable member can be successively displaced by the plurality of sets of electrodes. Here, the individual amounts of displacement are added, so that the movable member can be greatly displaced. Further, since the at least one drive electrode supporting section can be displaced, when, for example, one drive electrode attracts the movable member (a movable electrode) and displaces it, another drive electrode which has already previously attracted a movable electrode can be displaced with the movable member.

According to a second preferred embodiment of the present invention, an electrostatic actuator includes a substrate, a movable member securing section disposed at the substrate, a movable member that is spaced from the substrate, a movable connection beam which connects the movable member to the movable member securing section so that the movable member is displaceable towards and away from the movable member securing section, a plurality of movable electrodes which are disposed at the movable member and spaced from each other in a direction in which the movable member is displaced, a drive electrode securing section disposed at the substrate, and a plurality of drive electrodes disposed at the drive electrode securing section so that they are deformable by flexing in the direction in which the movable member is displaced, the plurality of drive electrodes opposing the respective movable electrodes with gaps therebetween in the direction in which the movable member is displaced.

With this unique structure, the movable member can be successively driven by the movable electrodes and the respective drive electrodes in order to greatly displace the movable member. In addition, since each drive electrode can be flexed and deformed in the direction in which the movable member is displaced, when, for example, one drive electrode attracts and displaces the movable member (a movable electrode), another drive electrode which has already previously attracted a movable electrode can be flexed and deformed and displaced with the movable member.

Although not exclusive, the sizes of the gaps between the movable electrodes and the respective drive electrodes may be set to be successively smaller. With this structure, when the actuator operates, first, an electrostatic force can be generated between the movable electrode and drive electrode of one set that are separated by the smallest gap. When, as a result of this, the movable member is displaced, the gap size between the movable electrode and the drive electrode of another set that are separated by the second smallest gap becomes sufficiently small. Therefore, the movable member can be further displaced by the electrostatic force that is generated between them. When the movable member is repeatedly moved in this manner from the electrodes that are separated by a small gap to the electrodes that are separated by a large gap, the movable member can be greatly displaced.

Although not exclusive, the electrostatic actuator may further include stoppers, disposed at the substrate, for restricting the displacement of the drive electrodes towards the respective movable electrodes and for allowing the drive electrodes to be pushed and moved by the respective movable electrodes.

With this structure, the stoppers prevent a reduction in the displacement of the movable electrodes (movable member) which corresponds to an amount by which the drive electrodes approach the movable electrodes when the drive electrodes attract the movable electrodes. In addition, when a movable electrode that is attracted to a drive electrode is further displaced by the electrostatic force between the electrodes of another set, the drive electrode can be pushed and moved by the movable electrode and displaced together.

Although not exclusive, the movable member may be supported by the movable member securing section through the movable connection beam in a cantilever manner. With this structure, it is possible to support only one side of the movable member, so that the supporting structure is greatly simplified.

Although not exclusive, the movable member may be supported at both sides thereof by the movable member securing section through the movable connection beam. With this structure, it is possible to stably and reliably support both sides of the movable member.

Although not exclusive, the movable member may be displaced in the horizontal direction along the substrate. By this structure, it is possible to reduce the size of the actuator in the vertical direction while ensuring the amount of displacement of the movable member in the horizontal direction.

According to a third preferred of the present invention, an electrostatic actuator includes a substrate which extends horizontally, a movable member securing section disposed at the substrate, a movable member having a front surface and a back surface, with the back surface of the movable member opposing the substrate with a gap therebetween in the vertical direction, a movable connection beam which connects the movable member to the movable member securing section so that the movable member is displaceable in the vertical direction, a movable electrode disposed on the front surface of the movable member, a drive electrode mounting member mounted to the substrate and disposed at the front surface side of the movable member, a drive electrode securing section disposed at the drive electrode mounting member, and a plurality of drive electrodes disposed at the drive electrode securing section so as to be deformable by flexing in the vertical direction, the plurality of drive electrodes opposing the movable electrode with gaps therebetween in the vertical direction.

With this structure, it is possible oppose the movable electrode that is disposed at the front surface of the movable member and the plurality of drive electrodes with a gap therebetween in the vertical direction. In addition, via these drive electrodes, the movable electrode (movable member) can be successively driven in order to greatly displace the movable member in the vertical direction. Further, when, for example, one drive electrode attracts the movable member (the movable electrode) and displaces it in the vertical direction, another drive electrode which has already previously attracted the movable electrode can be flexed and deformed and displaced with the movable member in the vertical direction.

Although not exclusive, the movable member may be formed of a conductive material, and the movable electrode may be formed using a portion of the movable member. With this structure, it is possible to form the movable electrode on, for example, the front surface of the movable member, so that the structure of and the process of forming the movable electrode can be simplified.

Although not exclusive, the movable member may be formed of an insulating material, the movable electrode may be disposed on the front surface of the movable member, and a variable capacitor may be disposed between the substrate and the back surface of the movable member, with the electrostatic capacitance of the variable capacitor changing in accordance with the amount of displacement of the movable member in the vertical direction.

By this structure, it is possible to dispose the movable electrode on the front surface of the movable member, and, for example, the electrodes defining the variable capacitor on the back side of the movable member and on the substrate. Therefore, it is possible to displace the movable member in the vertical direction by electrostatic forces produced between the movable electrode and the drive electrodes, so that the capacitance of the variable capacitor can be changed in accordance with the amount of displacement.

Although not exclusive, the sizes of the gaps between the movable electrode and the drive electrodes may be set to be successively smaller. With this structure, when the actuator operates, it is possible to successively produce electrostatic forces from the set of electrodes that are separated by a small gap to the set of electrodes that are separated by a large gap, so that the movable member is greatly displaced.

Although not exclusive, the electrostatic actuator may further include stoppers, disposed at the drive electrode mounting member, for restricting the displacement of the drive electrodes towards the movable electrode and for allowing the drive electrodes to be pushed and moved by the movable electrode.

With this structure, the stoppers prevent a reduction in the amount of displacement of the movable member caused by the displacement of the drive electrodes towards the movable electrode. In addition, after a drive electrode has attracted the movable electrode, the drive electrode can be pushed and moved by the movable electrode and displaced together.

Although not exclusive, the movable member may be supported at both sides thereof by the movable member securing section through the movable connection beam. With this structure, the movable member can be held horizontally by two sets of the movable member securing sections and the movable connection beams, so that, in this state, the movable member can be stably displaced vertically.

Although not exclusive, an insulating section may be disposed between the movable electrode and the drive electrodes for insulating the areas between the electrodes. With this structure, the movable electrode and the drive electrodes attract each other by electrostatic forces, so that it is possible to prevent the electrodes from becoming short-circuited by an insulating section.

Other features, elements, characteristics and advantages of the present invention will become more apparent from the following detailed description of preferred embodiments with reference to the attached drawings.

DETAILED DESCRIPTION OF PREFERRED EMBODIMENTS

Figure 1:
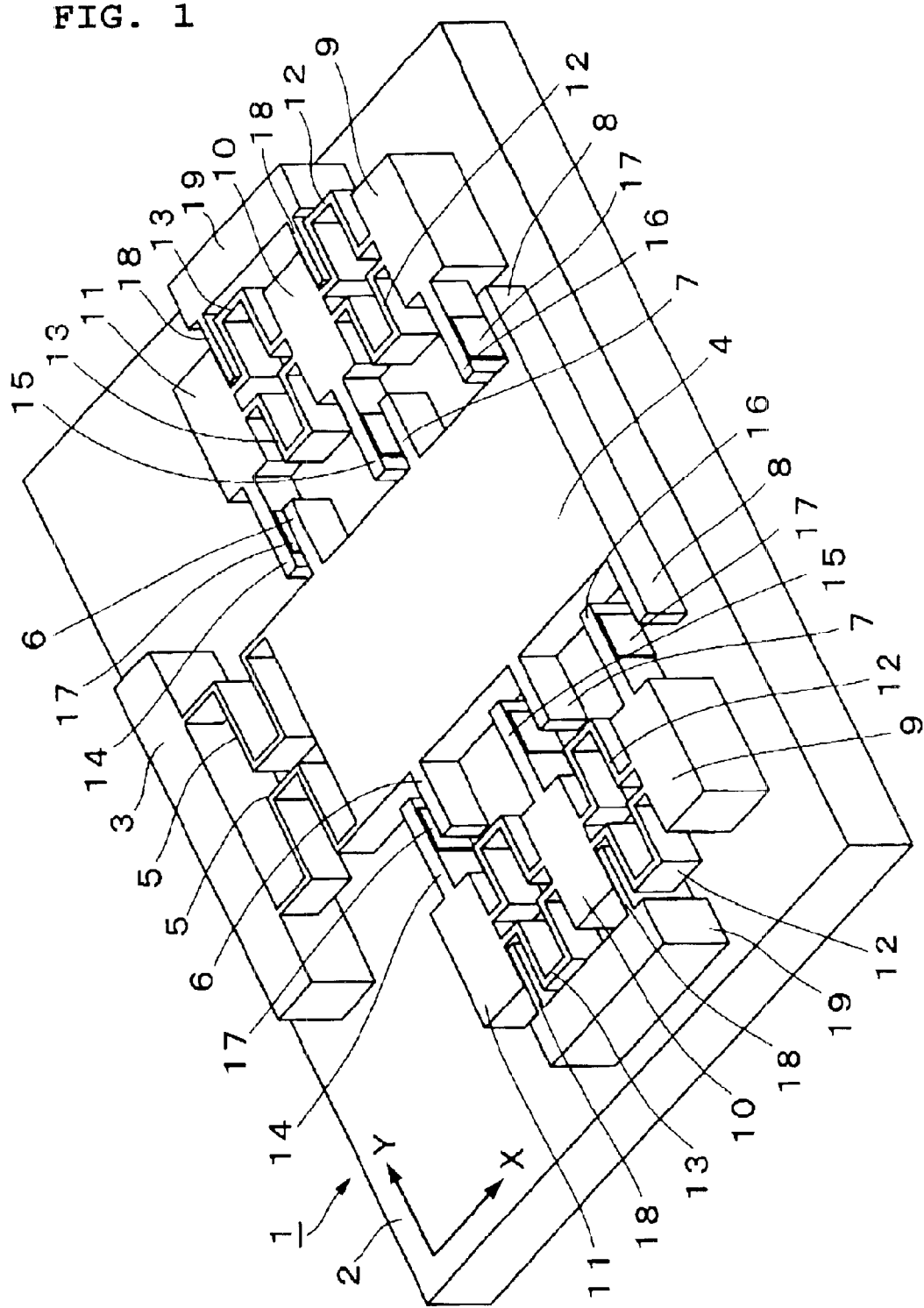
FIG. 1 is a perspective view of an electrostatic actuator of a first preferred embodiment of the present invention.

Electrostatic actuators of preferred embodiments of the present invention will be described below in detail with reference to the attached drawings.

FIGS. 1 to 6 illustrate a first preferred embodiment of an electrostatic actuator of the present invention. FIGS. 1 to 6 show an electrostatic actuator 1 and a substrate 2 defining the body of the electrostatic actuator 1. The substrate 2 is preferably formed of, for example, an insulating material having high resistance such as a silicon material or glass material, preferably has a substantially rectangular shape, and extends horizontally along the x axis and the y axis which are perpendicular to each other.

As shown in FIGS. 1 to 4, a movable member securing section 3, a movable member 4, movable connection beams 5, movable electrodes 6 to 8, drive electrode securing sections 9, drive electrode supporting sections 10 and 11, driving connection beams 12 and 13, stoppers 18, and possibly other elements, are formed at a surface of the substrate 2 preferably by micromachining, such as etching or other suitable processing, monocrystalline or polycrystalline silicon material having low resistance.

The movable member securing section 3 is provided at one side of the substrate 2 that extends towards the left and right (that is, in the x-axis direction). The movable member securing section 3 preferably has a substantially rectangular shape extending towards the front and back (that is, in the y-axis direction) and protrudes from the surface of the substrate 2.

The movable member 4 is disposed at the substrate with a gap therebetween, is integrally formed as, for example, a flat, substantially rectangular plate having relatively high rigidity, and is connected to the movable member securing section 3 by the movable connection beams 5, so that it can be displaced in the x-axis direction towards and away from the movable member securing section 3.

There are, for example, two movable connection beams 5 disposed between the movable securing section 3 and the movable member 4. Each movable connection beam 5 is preferably constructed as a cantilever beam which moves in concert with the movable member securing section 3 and supports one side of the movable member 4 in the x-axis, extends in the x-axis direction at a location that is separated from the substrate 2, and is disposed with a gap between it and the substrate 2 in the y-axis direction.

Each movable connection beam 5 has a portion thereof extending in the lengthwise direction that is bent into a substantially U shape, and can be flexed and deformed in the x-axis direction with a predetermined spring constant k1 by extending and contracting the bent portion. With this structure, each movable connection beam 5 supports the movable member 4 so that it can be displaced in the x-axis direction and restricts the displacement of the movable member 4 in the y-axis direction.

For example, six movable electrodes, that is, the movable electrodes 6 to 8 are disposed at the movable member 4 with gaps therebetween in the direction of displacement of the movable member 4 (that is, the x-axis direction), with three electrodes at each side of the movable member 4 disposed at the front and back of each other. Each of the movable electrodes 6 to 8 has an elongated flat plate configuration and protrudes from the movable member 4 in the y-axis direction.

For example, two drive electrode securing sections 9 are disposed at the substrate 2 so as to be positioned at both the front and back of the movable member 4 in the y-axis direction. Each drive electrode securing section 9 has, for example, a substantially rectangular shape, and protrudes from the surface of the substrate 2.

For example, four drive electrode supporting sections, that is, the drive electrode supporting sections 10 and 11 are disposed substantially parallel with the respective drive electrode securing sections 9 in the x-axis direction. The two drive electrode supporting sections 10 and the two drive electrode supporting sections 11 are disposed at the front and at the back of the movable member 4, and oppose the substrate 2 with a gap therebetween in the vertical direction. The drive electrode supporting sections 10 are connected to their respective drive electrode securing sections 9 through their respective driving connection beams 12 so that they can move towards and away from them. The drive electrode supporting sections 11 are connected to their respective drive electrode supporting sections 10 through their respective driving connection beams 13 so that they can move towards and away from them.

The driving connection beams 12 are disposed between their respective drive electrode securing sections 9 and their respective drive electrode supporting sections 10. The other driving connection beams 13 are disposed between their respective drive electrode supporting sections 10 and their respective drive electrode supporting sections 11. Much like the movable connection beams 5, the driving connection beams 12 and 13 can be flexed and deformed in the x-axis direction. In this case, a spring constant k2 of each of the driving connection beams 12 and 13 is sufficiently smaller than the spring constant k1 of each of the movable connection beams 5 (k1>>k2). The drive electrode securing sections 9 support the drive electrode supporting sections 10 and 11 so that they can be displaced through the respective driving connection beams 12 and the respective driving connection beams 13.

The drive electrodes 14 are disposed at their respective drive electrode supporting sections 11. The drive electrodes 15 are disposed at their respective drive electrode supporting sections 10. The drive electrodes 16 are disposed at their respective drive electrode supporting sections 9. The drive electrodes 14, 15 and 16 have elongated flat plates, are spaced by gaps in the x-axis direction, and protrude towards the movable member 4 in the y-axis direction from their respective drive electrode securing sections 9, their respective drive electrode supporting sections 10, and their respective drive electrode supporting sections 11. The drive electrodes 14 to 16 are disposed at one side of their respective movable electrodes 6 to 8 in the x-axis direction, and oppose them with gaps therebetween in the x-axis direction.

Figure 2:
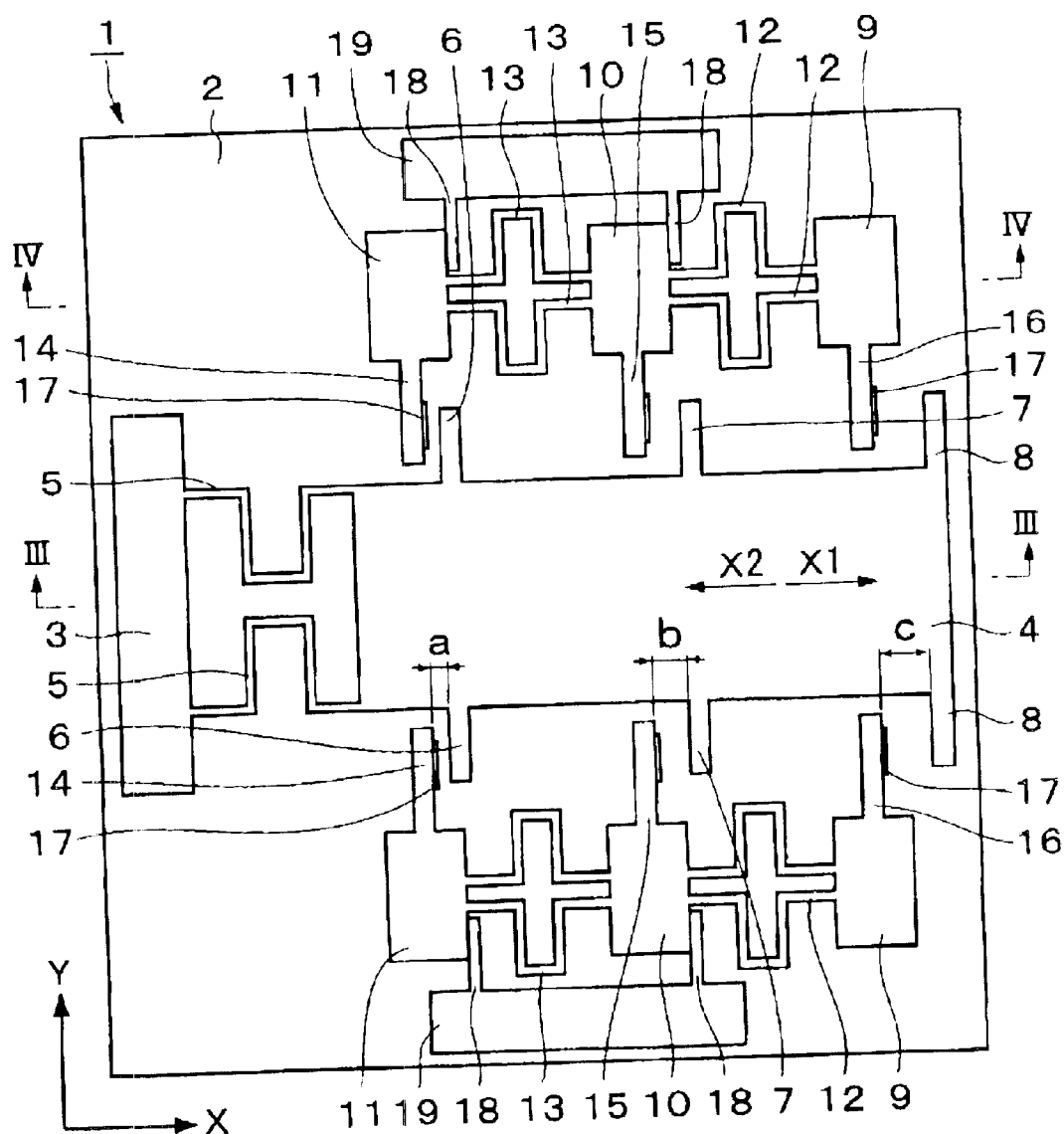
FIG. 2 is a plan view of the electrostatic actuator shown in FIG. 1.
Figure 3:
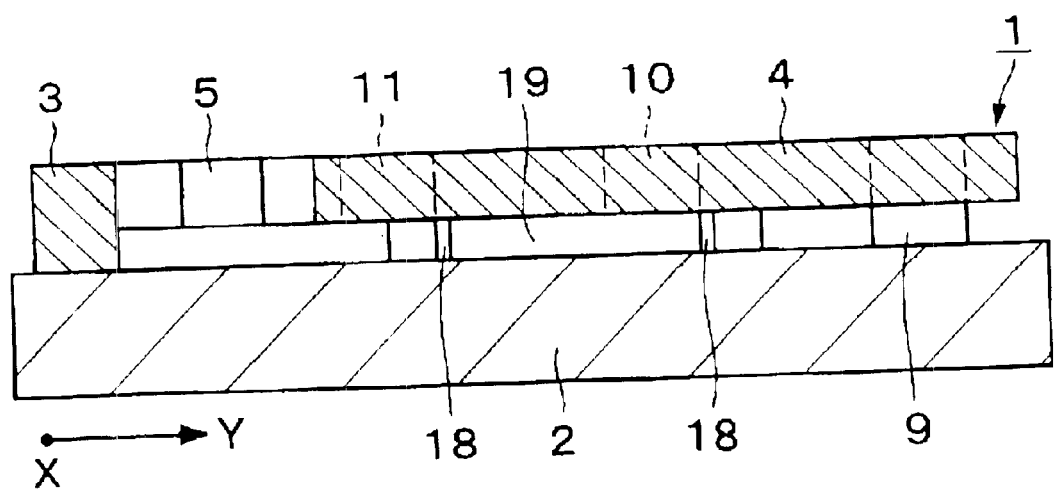
FIG. 3 is a vertical sectional view as seen in the direction of the arrows along line III—III in FIG. 2.
Figure 4:
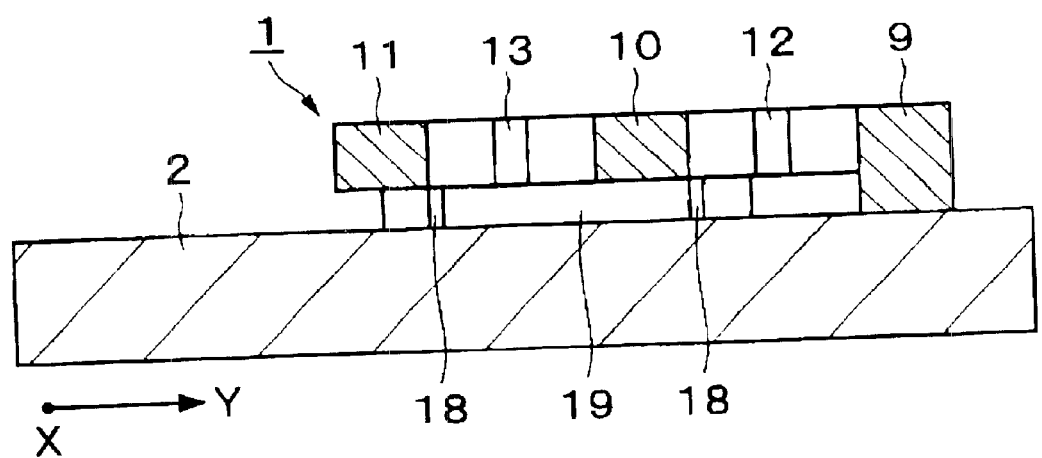
FIG. 4 is a vertical sectional view as seen in the direction of the arrows along line IV—IV in FIG. 2.

Here, as shown in FIG. 2, when the actuator 1 is not operating, the gaps between the left electrodes 6 and the respective left electrodes 14 each have a predetermined size a. Each gap size a is previously set so that, when a predetermined voltage is applied between the electrodes 6 and 14, a sufficiently large electrostatic force is produced for displacing the movable member 4 in opposition to the spring force of the movable connection beam 5. The gaps between the middle electrodes 7 and the respective middle electrodes 15 are each set with a size b, which is, for example, about twice the size a (b=2a). The gaps between the right electrodes 8 and the respective right electrodes 16 each has a size c, which is, for example, about three times the size a (c=3a).

Figure 5:
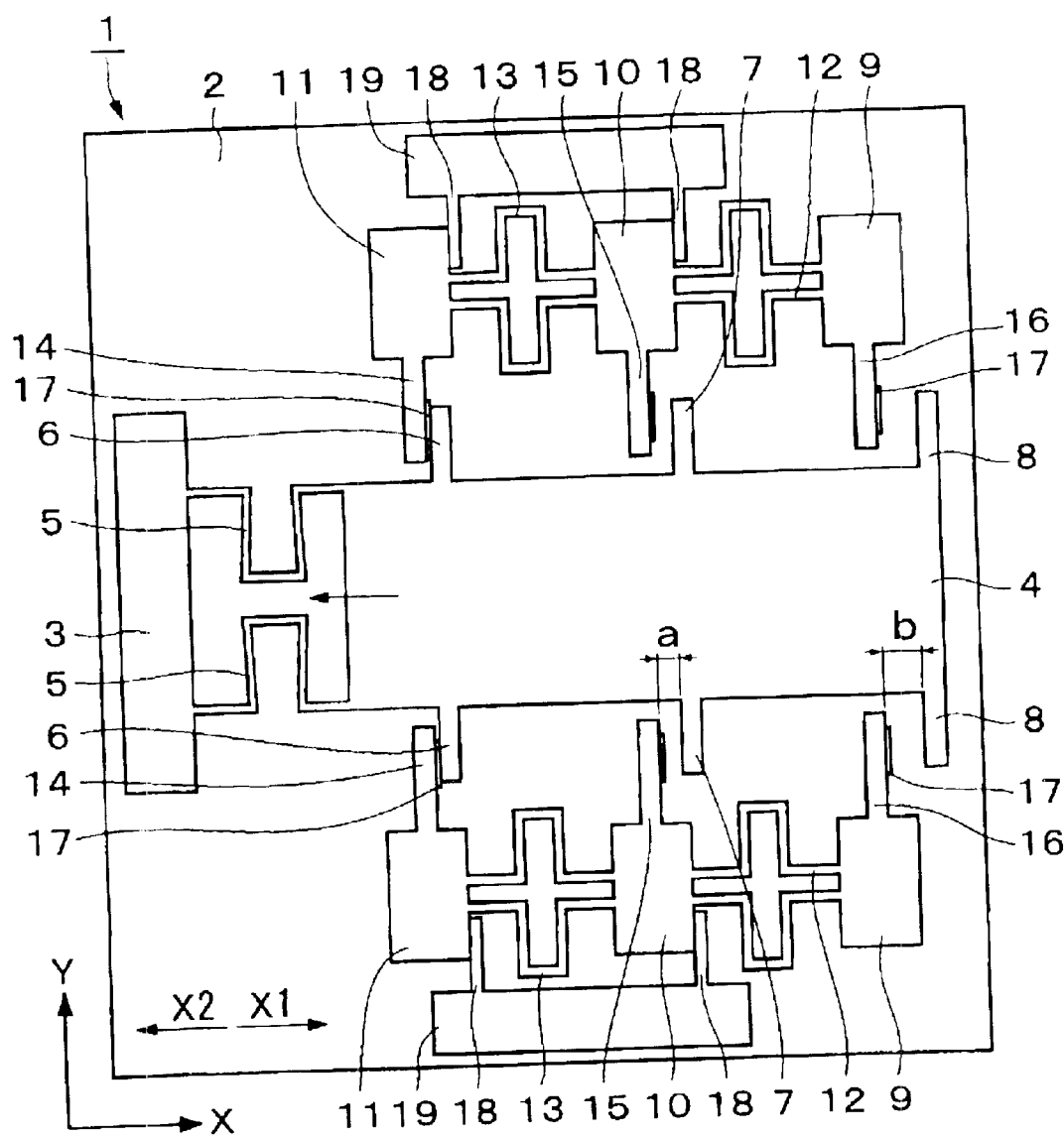
FIG. 5 is a plan view showing a state in which a movable member has been partially displaced.
Figure 6:
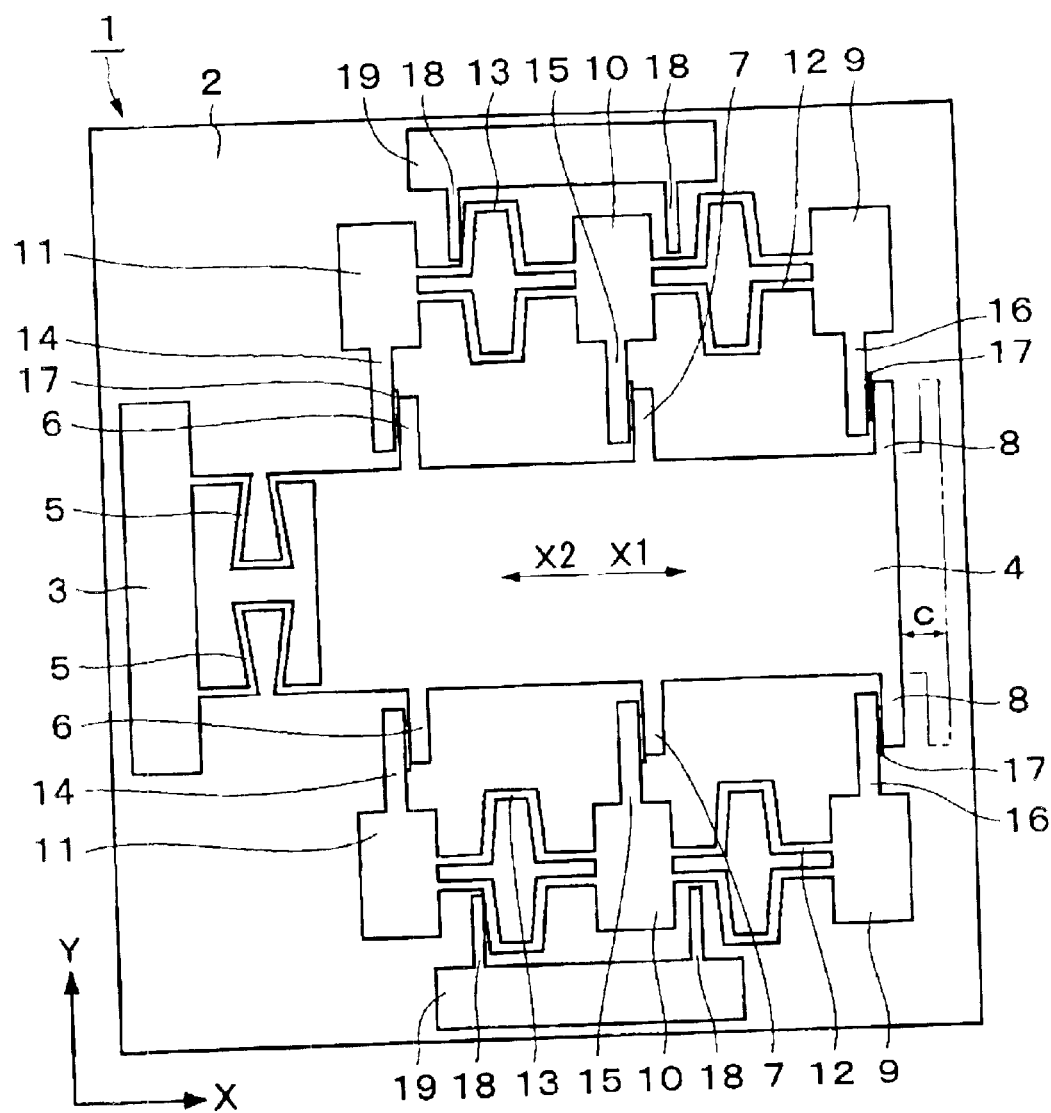
FIG. 6 is a plan view showing a state in which the movable member has been maximally displaced.

With this structure, comparing the sizes of the gaps between the electrodes 6 to 8 and their respective electrodes 14 to 16, the sizes c of the gaps between the right electrodes 8 and the right electrodes 16 that are disposed closest to their respective drive electrode securing sections 9 are the largest, with the sizes b of the gaps between the electrodes 7 and the respective electrodes 15 and the sizes a of the gaps between the electrodes 6 and the respective electrodes 14 becoming successively smaller with increasing distance from the respective drive electrode securing sections 9. As shown in FIGS. 5 and 6 described later, when the actuator 1 operates, by electrostatic forces that are produced between the electrodes 6 and the respective electrodes 14, the electrodes 7 and the respective electrodes 15, and the electrodes 8 and the respective electrodes 16, the movable member 4 is successively driven in the x-axis direction, so that the movable member 4 is greatly displaced in the x-axis direction by an amount corresponding to the sizes c of the gaps between the electrodes 8 and the respective electrodes 16.

Insulating films 17, defining insulating portions, are provided on side surfaces of the drive electrodes 14 to 16 facing the respective movable electrodes 6 to 8 in the x-axis direction. As shown in FIG. 1, each insulating film 17 is, for example, an insulating silicon oxide film or an insulating silicon nitride film, and is formed using, for example, the CVD method or the thermal oxidation method. The insulating films 17 insulate the areas between the movable electrodes 6 to 8 and their respective drive electrodes 14 to 16, so that they prevent a short circuit from occurring between the movable electrodes 6 to 8 and their respective drive electrodes 14 to 16 by preventing these electrodes from coming into direct contact with each other.

For example, four stoppers 18 are arranged so as to protrude from the substrate 2. When the actuator 1 is not operating, the stoppers 18 are in contact with, for example, surfaces of their respective drive electrode supporting sections 10 and 11 in the x-axis direction. The stoppers 18 restrict the displacement of the drive electrodes 14 and 15 (the drive electrode supporting sections 10 and 11) in the direction of arrow x1 shown in FIG. 2 towards the movable electrodes 6 and 7 from where they are positioned when the actuator 1 is not operating. The stoppers 18 also allow the drive electrodes 14 and 15 to be pushed and moved in the direction of arrow x2 by the respective movable electrodes 6 and 7. The stoppers 18 are connected to stopper supporting sections 19, which are provided at the substrate 2.

The electrostatic actuator 1 of the first preferred embodiment has the above-described structure. Next, the operation thereof will be described.

First, as shown in FIG. 2, by, for example, grounding the movable member securing section 3 and connecting the drive electrode securing sections 9 to a driving power supply (not shown), voltage is applied between the electrodes 6 and the respective electrodes 14, the electrodes 7 and the respective electrodes 15, and the electrodes 8 and the respective electrodes 16. As a result, a large electrostatic force which can drive the movable member 4 in opposition to the spring forces of the movable connection beams 5 is produced between the left electrodes 6 and the respective left electrodes 14 that are spaced by sufficiently small gap sizes a. In this case, since the electrostatic force that is produced between the electrodes is inversely proportional to the square of the distance between the electrodes, the electrostatic force that is produced between the other electrodes 7 and the respective electrodes 15 and the electrodes 8 and the respective electrodes 16 is small.

When the movable electrodes 6 are attracted to the respective drive electrodes 14 by electrostatic forces, the movable connection beams 5 are flexed and deformed. This causes the movable member 4 to be displaced in the direction of arrow x2 by an amount corresponding to the sizes a of the gaps between the electrodes 6 and the respective electrodes 14, so that the movable electrodes 6 come into contact with the drive electrodes 14 through the respective insulating films 17. At this time, since the stoppers 18 restrict the displacement of the drive electrodes 14 in the direction of arrow x1 towards the movable electrodes 6 by the electrostatic force (opposing force), the movable member 4 can be reliably displaced by an amount that corresponds to the sizes a of the gaps between the electrodes 6 and the respective electrodes 14.

As shown in FIG. 5, when the sizes of the gaps between the middle electrodes 7 and the respective electrodes 15 are reduced to sizes a by the displacement of the movable member 4 by an amount that corresponds to the sizes a of the gaps between the electrodes 6 and the respective electrodes 14, a large electrostatic force is produced between them, so that the movable electrodes 7 are attracted to the drive electrodes 15 that is displaced in the direction of arrow x1 is restricted by the respective stoppers 18. As a result, the movable member 4 is driven further in the direction of arrow x2 by an amount that corresponds to the sizes a of the gaps between the electrodes 7 and the respective electrodes 15, and is displaced by an amount that corresponds to a size 2a from where they are positioned when the actuator 1 is not operating.

At this time, the left movable electrodes 6 push and move the respective drive electrodes 14 in contact therewith through the insulating films 17 in the direction of arrow x2. By the flexing and expansion of the driving connection beams 13, the drive electrode supporting sections 11 move away from the stoppers 18 and are displaced in the direction of arrow x2 along with these electrodes 6 and 14. In this case, since the spring constant k2 of each driving connection beam 13 is sufficiently small compared to the spring constant k1 of each movable connection beam 5, it is possible to ignore its effects on the movement of the movable member 4.

When the sizes of the gaps between the right electrodes 8 and the respective right electrodes 16 are reduced to sizes a by the displacement of the movable member 4 by an amount that corresponds to the size 2a, an electrostatic force is produced between them, so that the movable member 4 is displaced further in the direction of arrow x2 by an amount that corresponds to the sizes a of the gaps between the electrodes 8 and the respective electrodes 16, so that the movable electrodes come into contact with the drive electrodes 16 in a stationary state through the insulating films 17. At this time, the drive electrodes 14 and 15 and the drive electrode supporting sections 10 and 11 are also displaced together through the respective driving connection beams 12 and 13. By this, the movable member 4 can be greatly displaced in the horizontal direction by an amount that corresponds to the size c from where it is positioned when the actuator 1 is not operating, which is indicated by alternate long and two short dashes in FIG. 6, to its maximally displaced position, which is indicated by a solid line in FIG. 6.

Accordingly, in the electrostatic actuator 1 of the first preferred embodiment, the movable member 4, which is supported by the movable member securing section 3 through the movable connection beams 5 so that it can be displaced, and, for example, two drive electrode supporting sections 10 and two drive electrode supporting sections 11, which are connected to the drive electrode securing sections 9 through the driving connection beams 12 and the driving connection beams 13 so that they can be move towards and away from them, are disposed at the substrate 2, and the drive electrodes 14 to 16 oppose the movable electrodes 6 to 8 of the movable member 4.

With this structure, an electrostatic force that is large enough to displace the movable member 4 is successively produced between the electrodes 6 and the respective electrodes 14, the electrodes 7 and the respective electrodes 15, and the electrodes 8 and the respective electrodes 16, so that the movable member 4 can be displaced in three stages by the amounts that correspond to the gap sizes a by these electrostatic forces. At this time, even with the drive electrodes 14 and 15 attracting the respective movable electrodes 6 and 7, by the displacement of the drive electrode supporting sections 10 and 11 through the respective driving connection beams 12 and 13, the drive electrodes 14 and 15 can be displaced with the movable member 4.

Therefore, when the actuator 1 operates, the amounts of displacement of the movable member 4 due to the electrodes 6 and 14, electrodes 7 and 15 and electrodes 8 and 16 can be added, so that, even if, for example, voltage from a driving power supply is not particularly large, the movable member 4 can be greatly displaced horizontally by an amount that corresponds to the sizes c of the gaps between the electrodes 8 and the respective electrodes 16.

In addition, since the movable member 4 can be constructed in an integral structure that is supported by the movable connection beams 5, etc., compared to the case where the movable member has, for example, a structure including a plurality of elements that can be displaced relative to each other, the movable member 4 can be provided with high rigidity.

With this structure, in accordance with the mass of the movable member 4, the spring constants of the movable connection beams 5, etc., the resonant frequency of the movable member 4 can be easily set to a high value of, for example, approximately 20 kHz, so that the movement of the movable member 4 can be stabilized and the scope of application and range of use of the actuator 1 can be increased.

In this case, since the sizes c, b, and a of the gaps between the movable electrodes 6 to 8 and the drive electrodes 14 to 16 are set successively smaller with increasing distance from the drive electrode securing sections 9, the sizes a of the gaps between the electrodes 6 and the respective electrodes 14 can be small so that a sufficient electrostatic force is first generated. In addition, the sizes b of the gaps between the electrodes 7 and the respective electrodes 15 and the sizes c of the gaps between the electrodes 8 and the respective electrodes 16 can be set larger than the largest gap size between electrodes that allows a sufficient electrostatic force to be produced at, for example, a certain drive voltage. Even if these sizes b and c are large, the movable member 4 can be smoothly driven in three stages in accordance with the gap sizes a, b, and c, and the final displacement amount can be accurately determined by the gap sizes c between the electrodes 8 and the respective electrodes 16.

Since the stoppers 18 are provided at the substrate 2, it is possible to prevent a reduction in the displacement of the movable member 4 by an amount that corresponds to the displacement of the drive electrodes 14 and 15 towards the respective movable electrodes 6 and 8 by the electrostatic force. Further, since the drive electrodes 14 and 15 can be pushed and moved away from the respective stoppers 18 by the respective movable electrodes 6 and 8, the drive electrodes 14 and 15 can be displaced along with the movable member 4 without interfering with the displacement of the movable member 4.

Since a cantilever beam structure which supports one side of the movable member 4 in the x-axis direction is defined by the movable member securing section 3 and the movable connection beams 5, the structure for supporting the movable member 4 can be simplified by the cantilever beam structure. In addition, since the movable member 4 is arranged so that it can be displaced horizontally, the actuator 1 can be made small in a direction that is substantially perpendicular to the substrate 2.

Since the insulating films 17 are disposed on the portions of the drive electrodes 14 to 16 opposing the movable electrodes 6 to 8, when the movable electrodes 6 to 8 are attracted, it is possible to reliably prevent a short circuit from occurring between the drive electrodes 14 to 16 and the movable electrodes 6 to 8 by preventing them from coming into direct contact with each other, thereby making it possible to stably operate the actuator 1.

Figure 7:
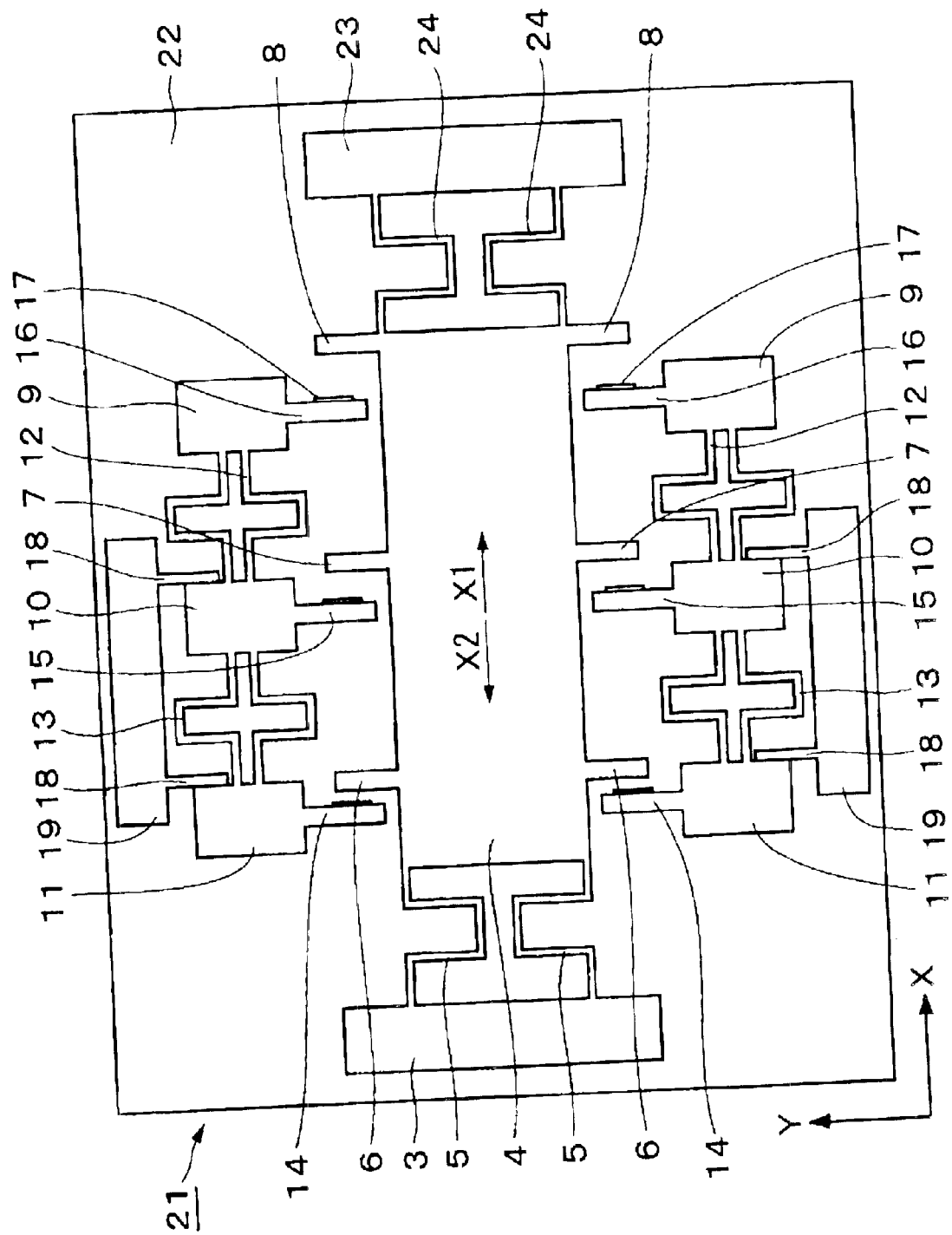
FIG. 7 is a plan view of an electrostatic actuator of a second preferred embodiment of the present invention.

FIG. 7 illustrates a second preferred embodiment of the present invention. The special feature of the second preferred embodiment is a structure for supporting both sides of a movable member. Component elements of an actuator of the second preferred embodiment corresponding to those of the actuator of the first preferred embodiment are given the same reference numerals and will not be described below.

The structure of an electrostatic actuator 21 of the second preferred embodiment is substantially the same as that of the first preferred embodiment. In the electrostatic actuator 21, two movable member securing sections 3 and 23, two movable connection beams 5, and two movable connection beams 24 are disposed at a substrate 22. The movable member securing sections 3 and 23 are disposed on the left and right sides of the movable member 4 in the x-axis direction.

One side of the movable member 4 in the x-axis direction is connected to the moving-side securing section 3 through each of the movable connection beams 5, whereas the other side thereof is connected to the movable member securing section 23 through each of the driving connection beams 24. With this structure, the movable member securing sections 3 and 23 and the movable connection beams 5 and 24 define a beam structure that supports both the left and right sides of the movable member 4.

Accordingly, even the actuator 21 of the second preferred embodiment having such a structure can provide substantially the same operational advantages as those that are provided by the first preferred embodiment. In particular, in the second preferred embodiment, since both the left and right sides of the movable member 4 can be stably supported by the left movable member securing section 3 and movable connection beams 5 and the right movable member securing section 23 and movable connection beams 24, when the actuator 21 operates, the movable member 4 can be prevented from tilting in the horizontal direction (that is, the y-axis direction) or the vertical direction, so that the movable member 4 can be smoothly displaced in the x-axis direction.

Figure 8:
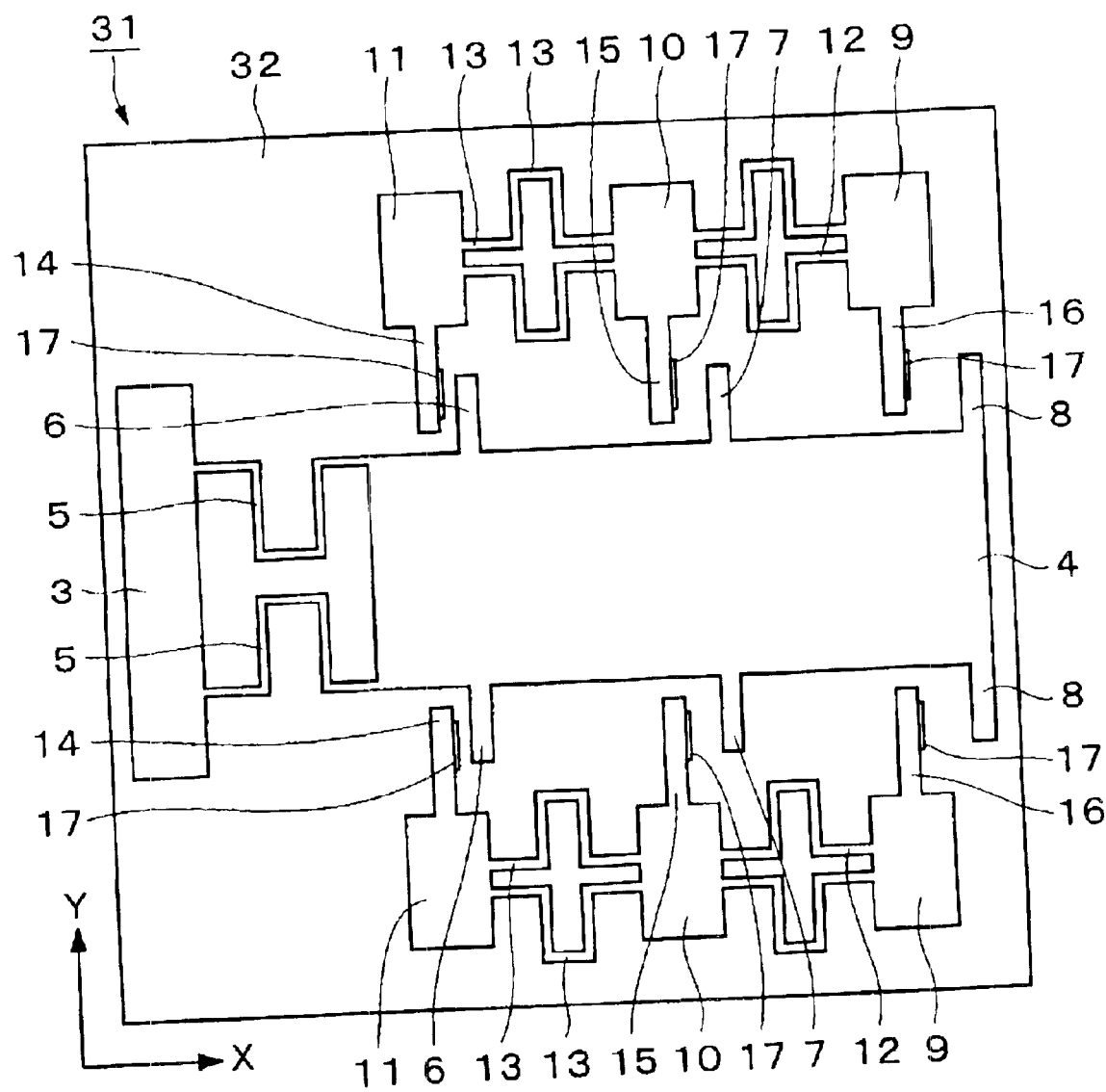
FIG. 8 is a plan view of an electrostatic actuator of a third preferred embodiment of the present invention.
Figure 9:
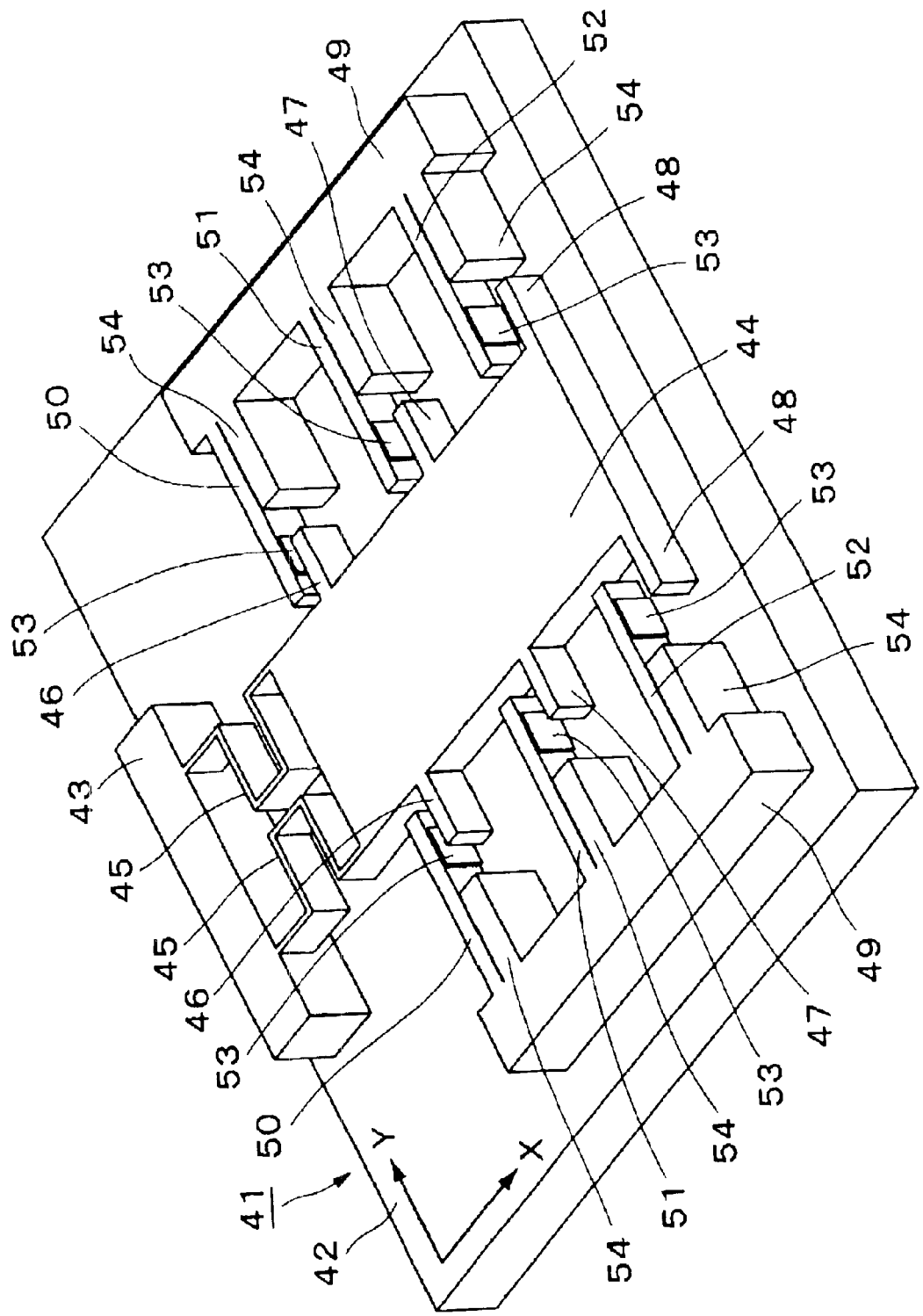
FIG. 9 is a perspective view of an electrostatic actuator of a fourth preferred embodiment of the present invention.

FIG. 8 illustrates a third preferred embodiment of the present invention. The special feature of the third preferred embodiment is a structure which does not use the stoppers used in the first preferred embodiment. Component elements of an actuator of the third preferred embodiment corresponding to those of the actuator of the first preferred embodiment are given the same reference numerals and will not be described below.

The structure of an electrostatic actuator 31 of the third preferred embodiment is substantially the same as the structure of the actuator 1 of the first preferred embodiment. It differs in that the stoppers 18 and the stopper supporting sections 19 are not provided at a substrate 32.

Accordingly, even the actuator 31 of the third preferred embodiment having such a structure can provide substantially the same operational advantages as those that are provided by the first preferred embodiment. In particular, in the third preferred embodiment, even if the stoppers 18 and the stopper supporting sections 19 are not provided, the movable member 4 can be more than sufficiently and greatly displaced compared to a movable member used in a related technology, so that the substrate 32 can be reduced in size when necessary, and the structure of the actuator 31 can be simplified.

FIGS. 9 to 14 illustrate a fourth preferred embodiment of the present invention. The special feature of the fourth preferred embodiment is a structure in which drive electrodes are flexed and deformed. Component elements of an actuator of the fourth preferred embodiment corresponding to those of the actuator of the first preferred embodiment are given the same reference numerals and will not be described below.

An electrostatic actuator 41 and an insulating substrate 42 defining the body of the electrostatic actuator 41 are provided. Much as in the first preferred embodiment, a movable member securing section 43, a movable member 44, movable connection beams 45, movable electrodes 46 to 48, drive electrode securing sections 49, drive electrodes 50 to 52, stoppers 54, etc., which are described later, are provided at a surface of the substrate 42 by using, for example, a silicon material having low resistance.

The movable member securing section 43 is provided at the substrate 42. Much as in the first preferred embodiment, the movable member 44 is connected to the movable member securing section 43 through each movable connection beam 45 so that the movable member 44 can be displaced in the x-axis direction. Six movable electrodes, that is, the movable electrodes 46 to 48 are arranged at the movable member 44 so as to be separated from each other with gaps in the x-axis direction (that is, the direction in which the movable member 44 is displaced), with three movable electrodes 46, 47, and 48 protruding from each side of the movable member 44 in the y-axis direction.

For example, two drive electrode securing sections 49 are provided at the substrate 42. The drive electrode securing sections 49 preferably have elongated rectangular shapes that extend in the x-axis direction, and are disposed on both sides of the movable member 44 in the y-axis direction.

Figure 10:
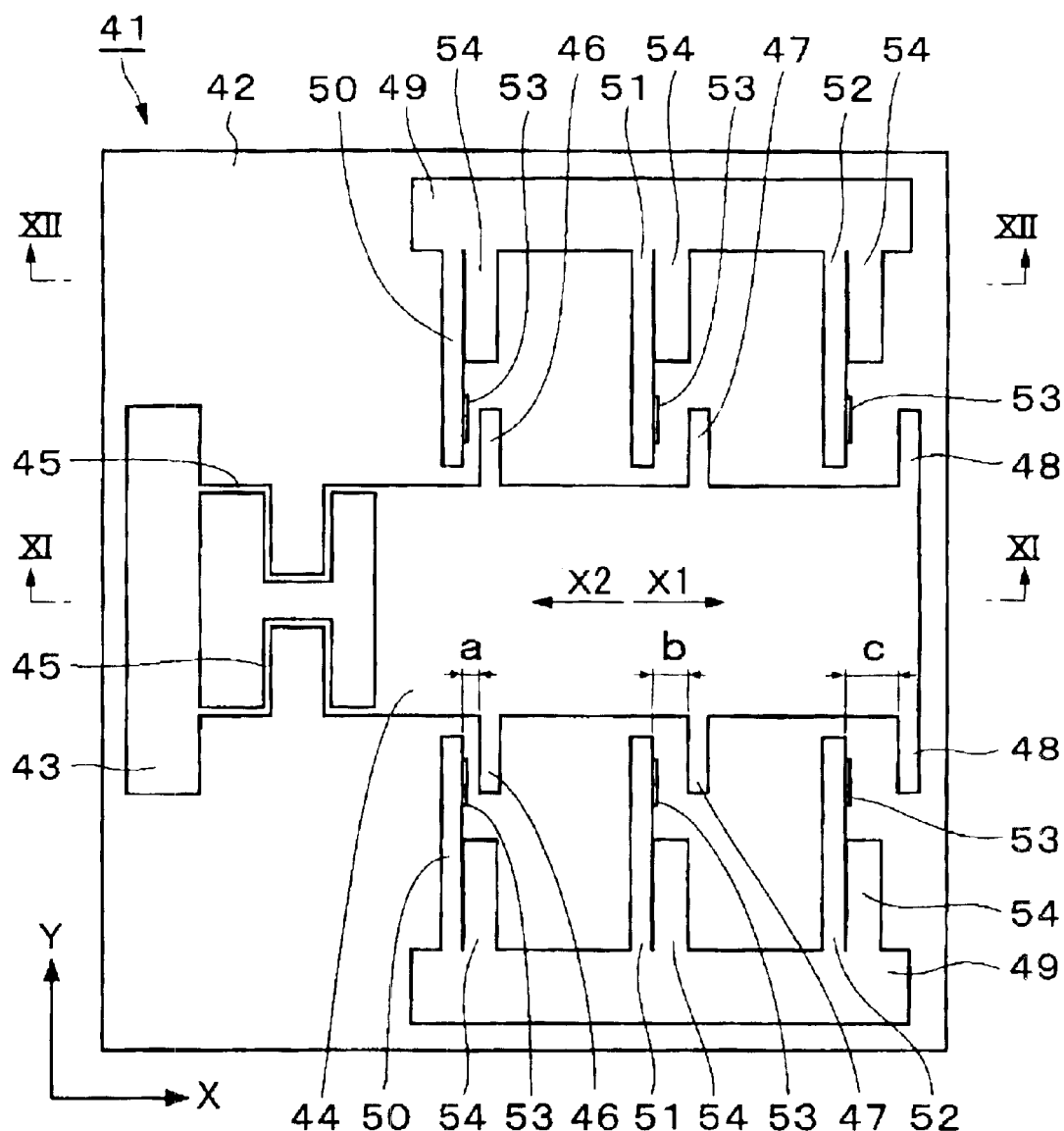
FIG. 10 is a plan view of the electrostatic actuator shown in FIG. 9.
Figure 11:
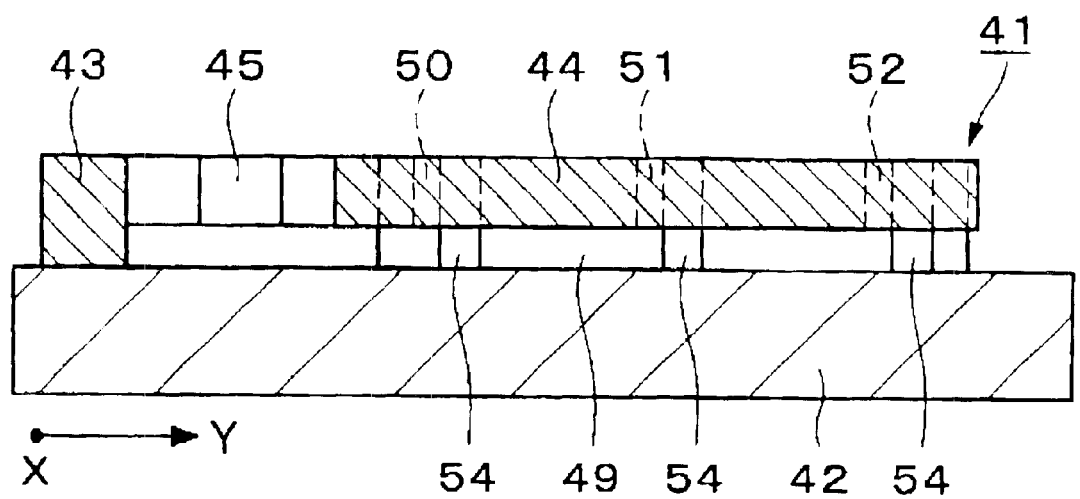
FIG. 11 is a vertical sectional view as seen in the direction of the arrows along line XI—XI in FIG. 10.
Figure 12:
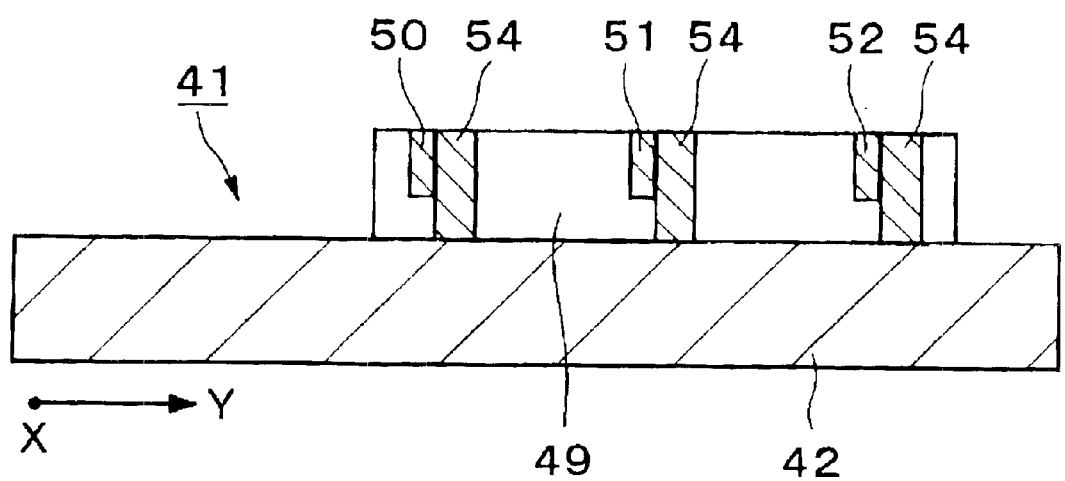
FIG. 12 is a vertical sectional view as seen in the direction of the arrows along line XII—XII in FIG. 10.

Six drive electrodes, that is, the drive electrodes 50 to 52 are provided, with three drive electrodes 50, 51, and 52 being provided at each drive electrode securing section 49. As shown in FIGS. 10 to 12, the drive electrodes 50 to 52 are elongated flat plates having plate springs that are thin in the x-axis direction, and are disposed with gaps therebetween in the x-axis direction at locations that are separated from the substrate 42.

The drive electrodes 50 to 52 protrude in the y-axis direction towards the movable member 44 from the drive electrode securing sections 49 disposed at the front and back sides. These protruding end sides can be flexed and deformed in the x-axis direction (that is, the plate thickness direction) by being pushed and moved by the movable electrodes 46 to 48. The drive electrodes 50 to 52 oppose the respective movable electrodes 46 to 48 with gaps therebetween in the x-axis direction. Insulating films 53 that insulate the areas between the drive electrodes 50 to 52 and the respective movable electrodes 46 to 48 are provided on surfaces of the drive electrodes 50 to 52 in the x-axis direction thereof.

Much as in the first preferred embodiment, as shown in FIG. 10, when the actuator 41 is not operating, the gaps between the left electrodes 46 to and the respective left electrodes 50 are previously set with predetermined sizes a, the gaps between the middle electrodes 47 and the respective middle electrodes 51 are previously set with sizes b, which are, for example, about twice the gap sizes a, and the gaps between the right electrodes 48 and the respective right electrodes 52 are previously set with sizes c, which are about three times the gap sizes a. Therefore, these gap sizes are set so that the sizes b and a become successively smaller from the largest gap sizes c.

For example, six stoppers 54 are arranged so as to protrude from the substrate 42 at locations adjacent to their respective drive electrodes 50 to 52. When the actuator 41 is not operating, the stoppers 54 are in contact with, for example, side surfaces of the drive electrodes 50 to 52 in the x-axis direction. The stoppers 54 restrict the displacement of the drive electrodes 50 to 52 in the direction of arrow x1 shown in FIG. 10 towards the movable electrodes 46 to 48 from where they are positioned when the actuator 1 is not operating. The stoppers 54 also allow the drive electrodes 50 to 52 to be pushed and moved in the direction of arrow x2 by the respective movable electrodes 46 to 48. Ends of the stoppers 54 are connected to drive electrode supporting sections 49.

The electrostatic actuator 41 of the fourth preferred embodiment has the above-described structure. Next, the operation thereof will be described.

First, as shown in FIG. 10, when a voltage is applied between the movable electrodes 46 to 48 and the respective drive electrodes 50 to 52, the left movable electrodes 46 are first attracted to the respective drive electrodes 50 by electrostatic forces. For this reason, the movable member 44 is displaced in the direction of arrow x2 by an amount that corresponds to the sizes a of the gaps between the movable electrodes 46 and the respective movable electrodes 50, so that, through the insulating films 53, the movable electrodes 46 come into contact with the respective drive electrodes 50 that is displaced in the direction of arrow x1 is restricted by the respective stoppers 50.

Figure 13:
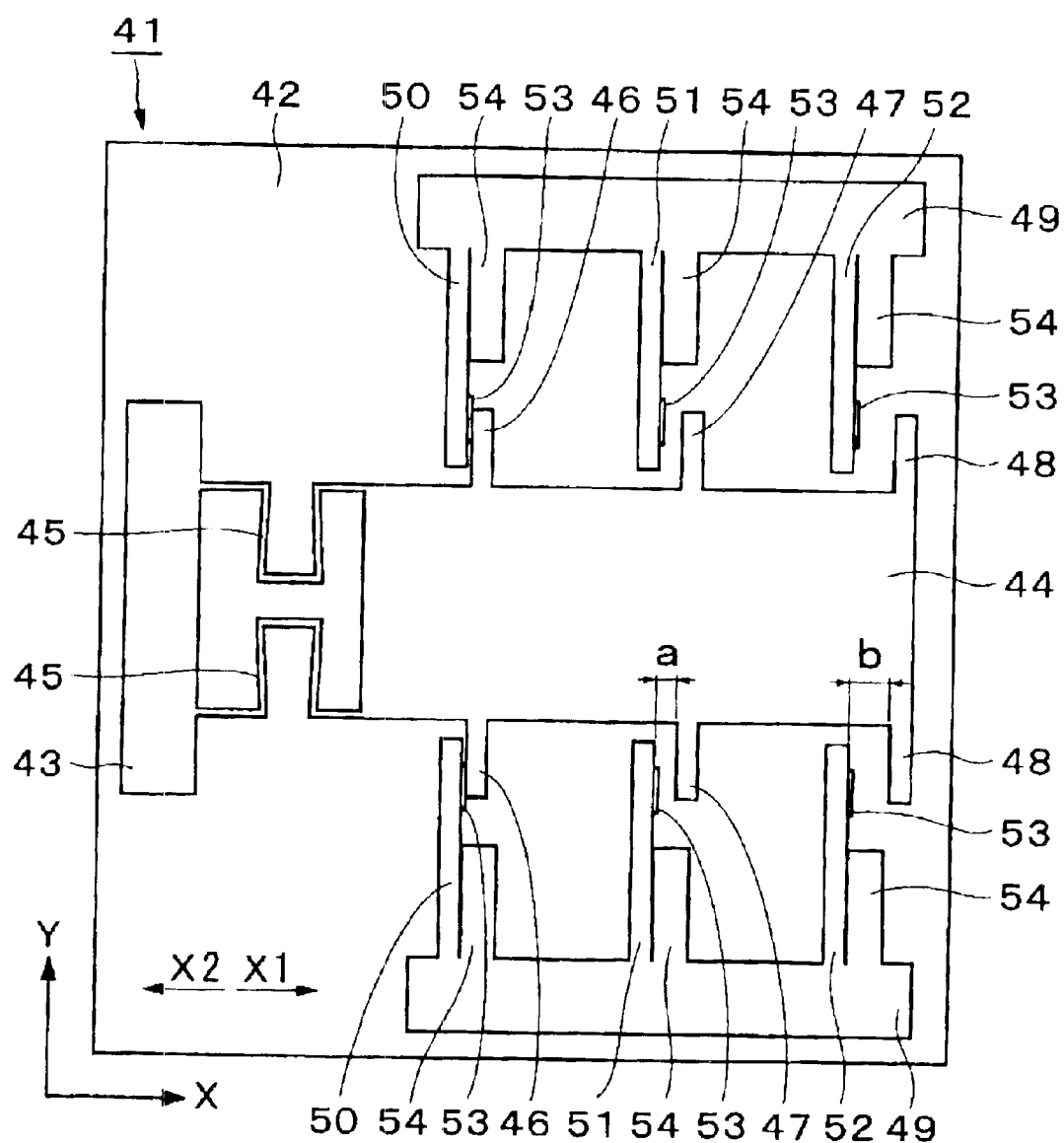
FIG. 13 is a plan view showing a state in which a movable member has been displaced partially.
Figure 14:
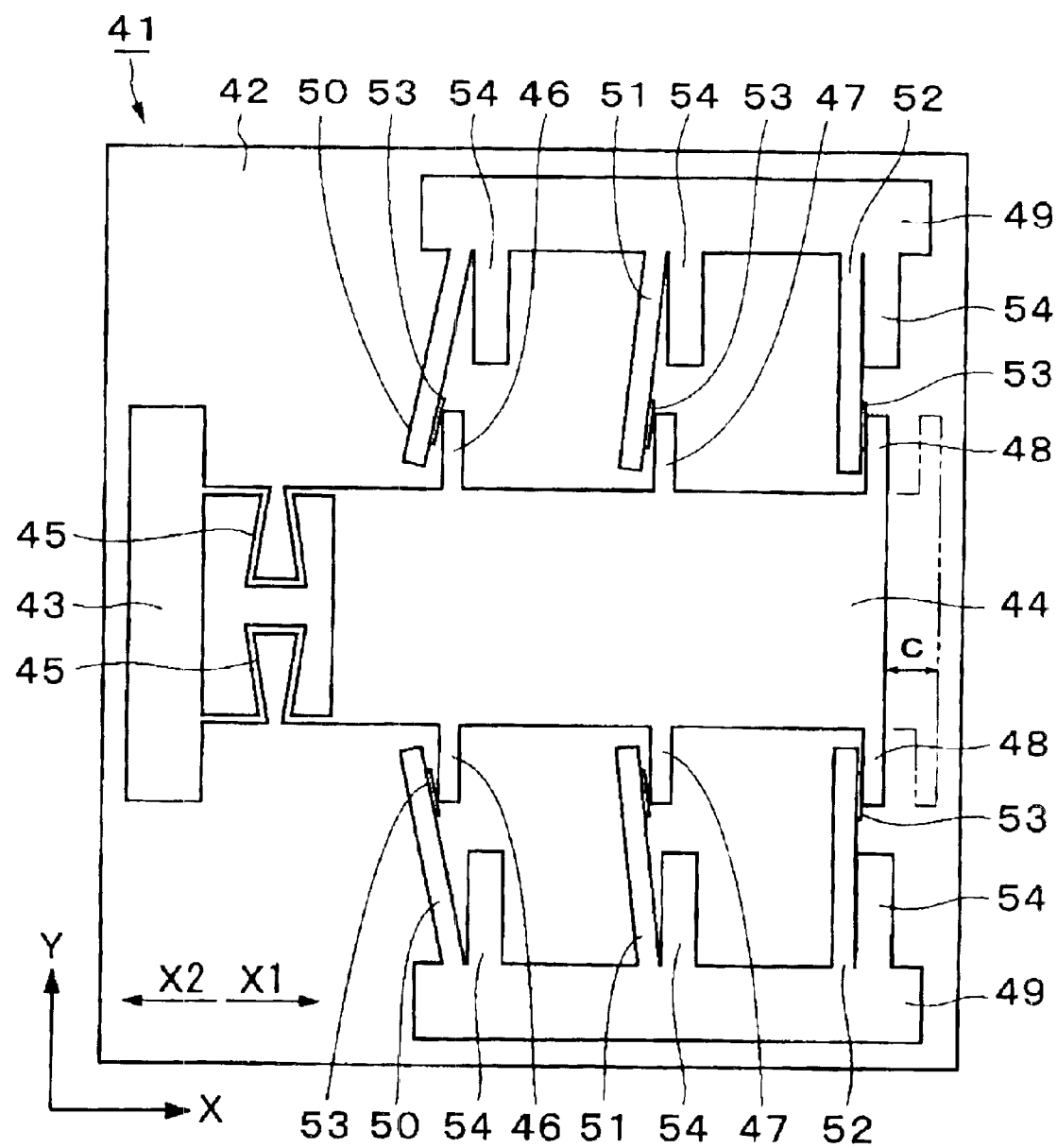
FIG. 14 is a plan view showing a state in which the movable member has been maximally displaced.
Figure 15:
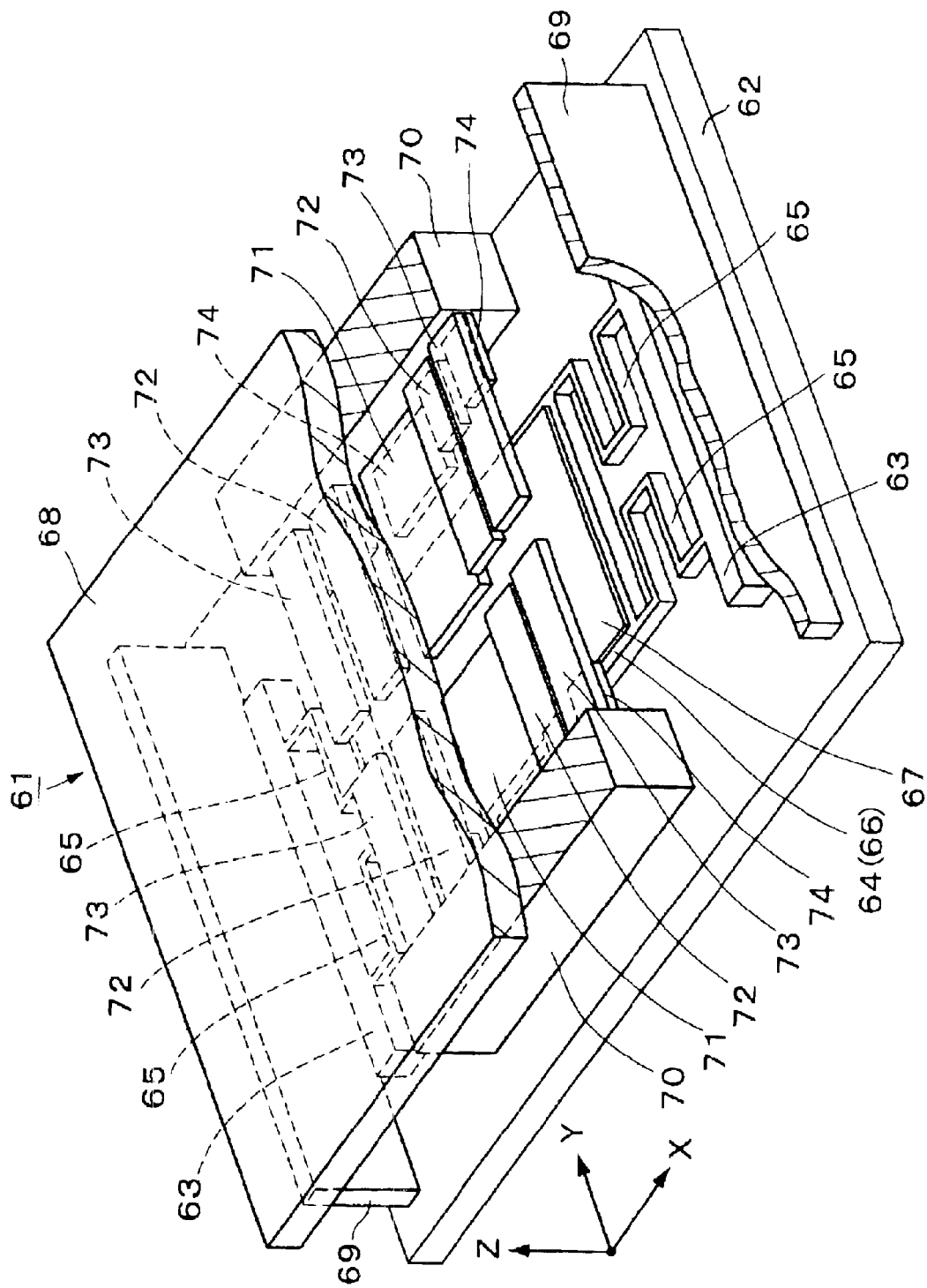
FIG. 15 is a partly cutaway perspective view of an electrostatic actuator of a fifth preferred embodiment of the present invention.
Figure 16:
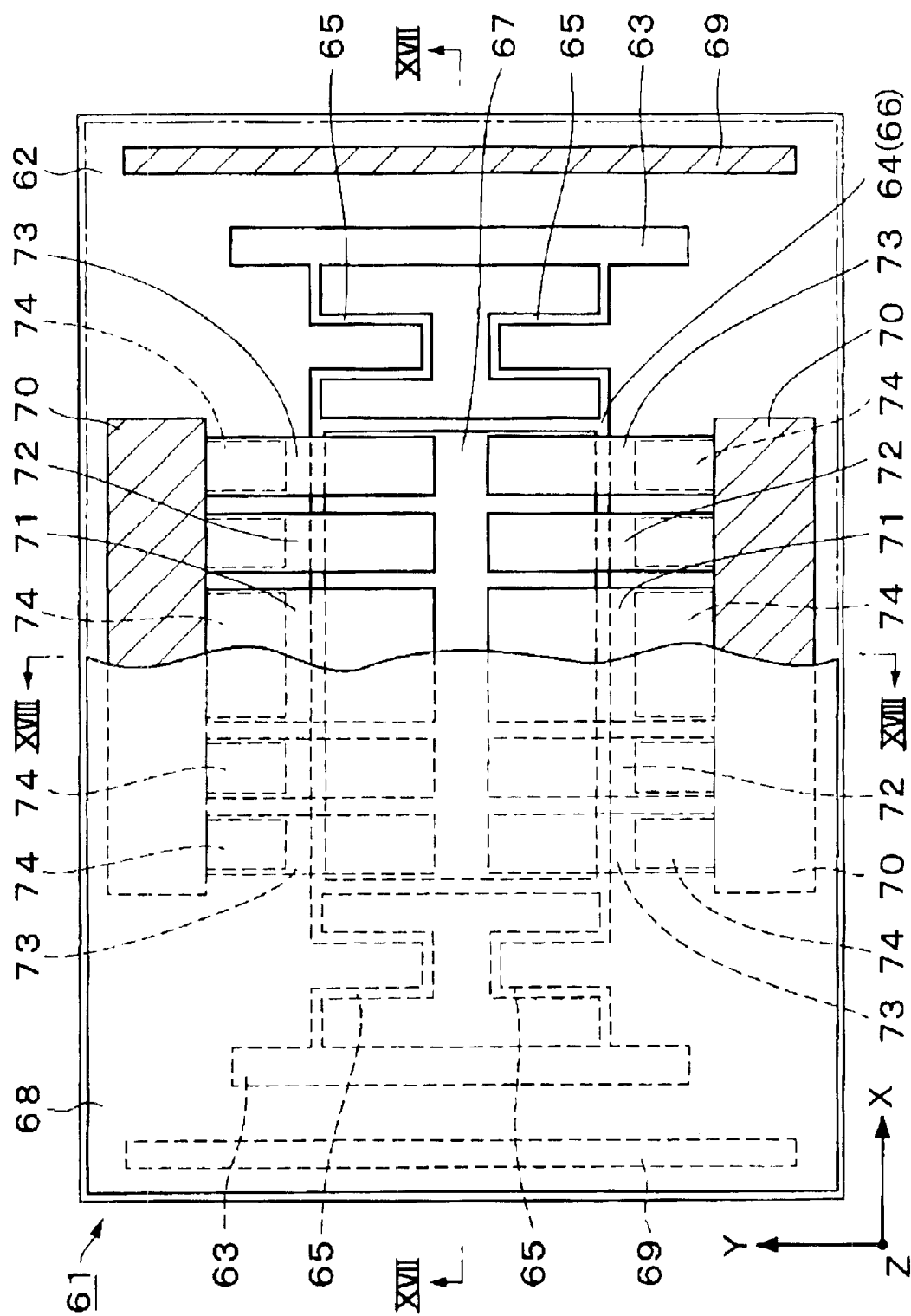
FIG. 16 is a partly cutaway plan view of the electrostatic actuator shown in FIG. 15.

With this structure, as shown in FIG. 13, the gap sizes between the middle electrodes 47 and the respective middle electrodes 51 are reduced to sizes a shown in FIG. 13, and the movable electrodes 47 are attracted to the respective drive electrodes 51 by electrostatic forces, so that the movable member 44 is driven in the direction of arrow x2 by an amount that corresponds to the gap sizes a between the electrodes 47 and the respective electrodes 51. At this time, the left drive electrodes 50 are flexed and deformed with respect to the drive electrode securing sections 49 by being pushed and moved by the respective movable electrodes 46, so that these electrodes 46 and 50 are displaced together in the direction of arrow x2 away from the stoppers 54.

As a result, since the gap sizes between the right electrodes 48 and the respective right electrodes 52 are reduced to gap sizes a, and an electrostatic force is produced therebetween, the movable member 44 is further displaced in the direction of arrow x2 by an amount that corresponds to the gap sizes a between the electrodes 48 and the respective electrodes 52 while it flexes and deforms the drive electrodes 50 and 51. Therefore, the movable member 44 can be greatly displaced horizontally by an amount that corresponds to the gap sizes c from where it is positioned when the actuator 1 is not operating, which is indicated by alternate long and two short dashes in FIG. 14, to its maximally displaced position, which is indicated by a solid line in FIG. 14.

Accordingly, even the actuator 41 of the fourth preferred embodiment having such a structure can provide substantially the same operational advantages as those that are provided by the first preferred embodiment. In particular, in the fourth preferred embodiment, since the actuator 41 includes, for example, two sets of flexibly deformable drive electrodes 50 to 52, the drive electrodes 50 and 51 can be displaced with the movable member 44 by being flexed and deformed by being pushed and moved by the respective movable electrodes 46 and 47. With this structure, it is no longer necessary to use a plurality of drive electrode supporting sections, driving connection beams, etc., so that the structure of the drive electrode securing sections 49, etc., is greatly simplified.

FIGS. 15 to 22 illustrate a fifth preferred embodiment of the present invention. The special feature of the fifth preferred embodiment is a structure that displaces a movable member in the vertical direction. Component elements of an actuator of the fifth preferred embodiment corresponding to those of the actuator of the first preferred embodiment are given the same reference numerals and will not be described below.

An electrostatic actuator 61 and an insulating substrate 62 defining the body of the electrostatic actuator 61 are provided. Much as in the first preferred embodiment, movable member securing sections 63, a movable member 64, movable connection beams 65, a movable electrode 66, etc., which are described later, are disposed at the substrate 62 by using, for example, a silicon material which has low resistance and which is electrically conductive. The substrate 62 is disposed so that it extends horizontally in two of the x-axis direction, the y-axis direction, and the z-axis direction, which are perpendicular to each other, such as, in the x-axis direction and the y-axis direction, and vertically in the x-axis direction.

For example, two movable member securing sections 63 are provided at the substrate 62. Much as in the second preferred embodiment, the movable member securing sections 63 are disposed on both sides of the movable member 64 in the x-axis direction.

The movable member 64 is disposed between the movable member securing sections 63. As shown in FIGS. 15 to 18, the movable member 64 is integrally constructed as a substantially rectangular flat plate extending in the horizontal direction, and has a front surface 64A and a back surface 64B. The back surface 64B of the movable member 64 opposes the substrate 62 with a gap therebetween in the vertical direction (that is, the z-axis direction).

Four movable connection beams 65, disposed on both the left and right sides of the movable member 64, have bent forms almost like those of the first preferred embodiment, but are flexibly bendable in the z-axis direction with respect to the movable member securing sections 63. Both sides of the movable member 64 in the x-axis direction are connected to the respective movable member securing sections 63 through two movable connection beams 65. These movable member securing sections 63 and movable connection beams 65 define a beam structure that supports both the left and right sides of the movable member 64 so that the movable member 64 can be displaced in the z-axis direction.

The movable electrode 66, which is provided at the surface 64A of the movable member 64, is defined by a surface portion of the movable member 64 formed of, for example, a silicon material having low resistance. An insulating film 67, which is formed of, for example, an insulating material such as a silicon oxide material or a silicon nitride material, for insulating the areas between the movable electrode 66 and drive electrodes 71 to 73 (described later) is provided on the surface 64A of the movable member 64.

A drive electrode mounting plate 68, functioning as a drive electrode mounting member, is mounted to the substrate 62 through two mounting plate supporting sections 69. The drive electrode mounting plate 68 is formed of, for example, a silicon material or glass material, has a substantially rectangular shape that is almost like the shape of the substrate 62, and opposes the front surface 64A of the movable member 64 with a gap therebetween in the vertical direction. Drive electrode securing sections 70, drive electrodes 71 to 73, stoppers 74, etc., are provided at the back surface side of the drive electrode mounting plate 68 using, for example, a silicon material having low resistance.

For example, two drive electrode securing sections 70, which protrude from the back surface of the drive electrode mounting plate 68, have elongated substantially rectangular shapes extending in the x-axis direction, and are disposed on both sides of the movable member 64 in the y-axis direction.

Figure 17:
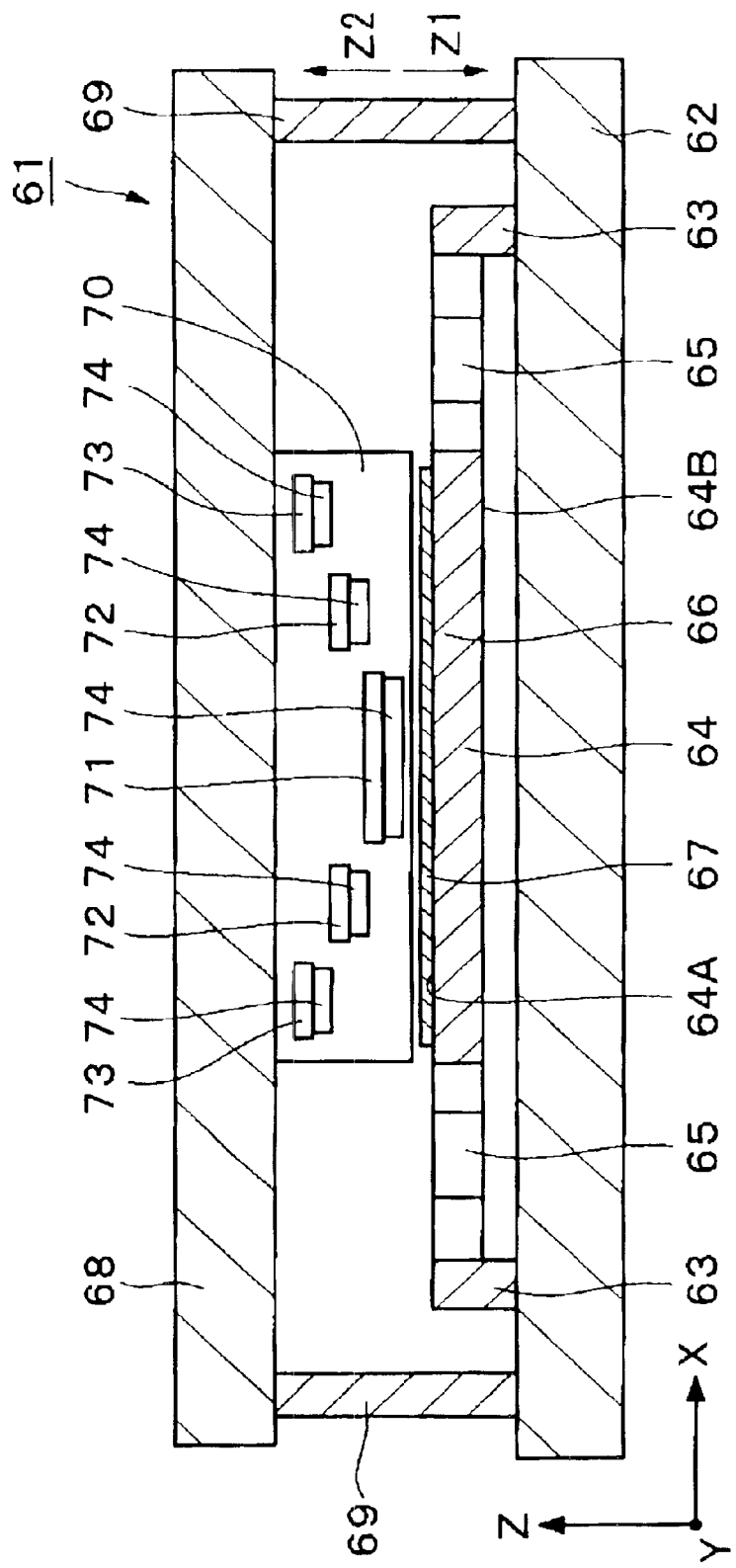
FIG. 17 is a vertical sectional view as seen in the direction of the arrows along line XVII—XVII in FIG. 16.
Figure 18:
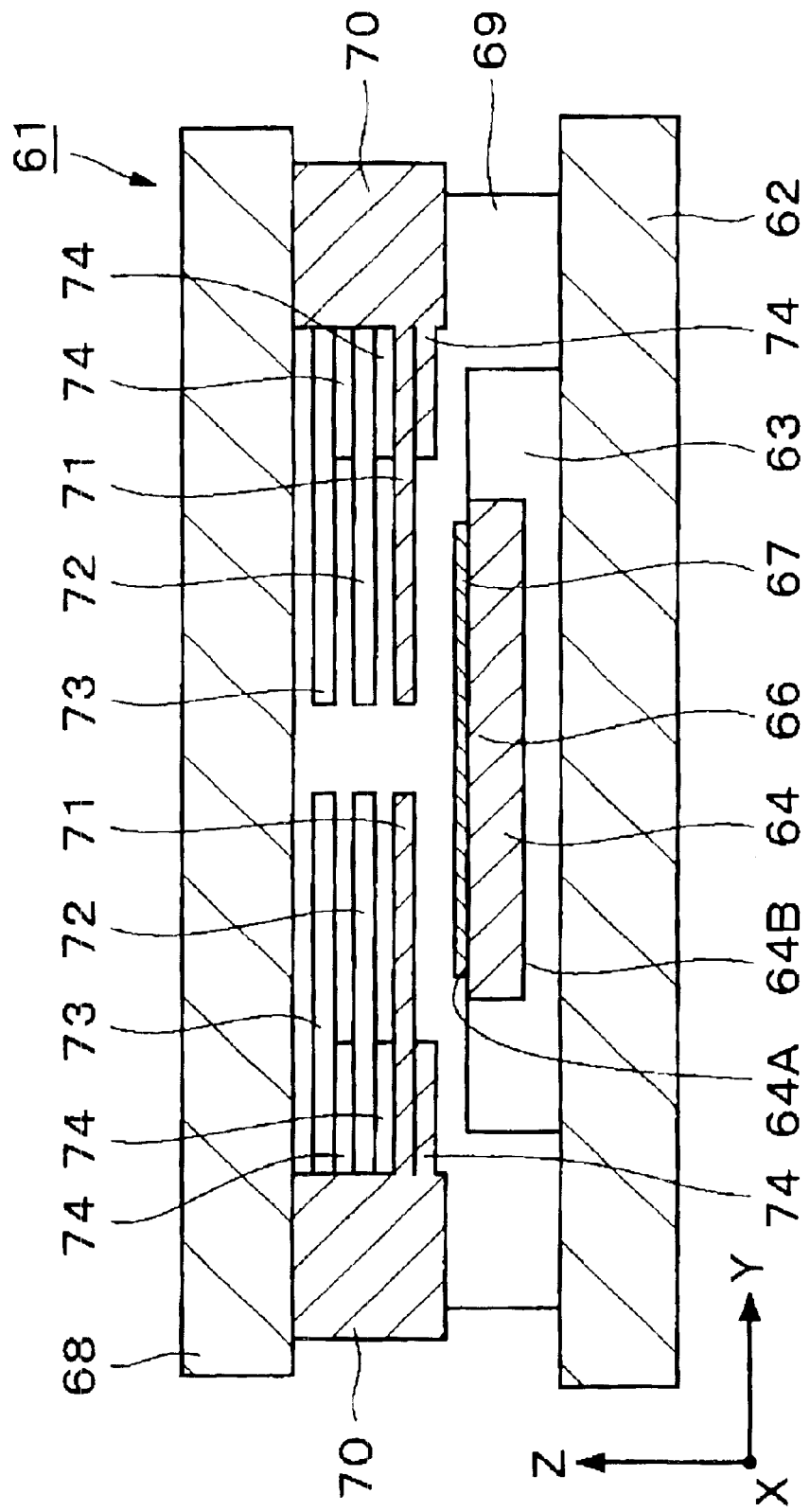
FIG. 18 is a vertical sectional view as seen in the direction of the arrows along line XVIII—XVIII in FIG. 16.

As shown in FIGS. 17 and 18, the plurality of drive electrodes 71 to 73 are provided on their respective drive electrode securing sections 70, with the drive electrodes 72 and 73 being disposed on both sides of the respective drive electrodes 71 that are disposed in the middle in the x-axis direction. These drive electrodes 71 to 73 are arranged in a line in the form of a substantially V shaped configuration with gaps therebetween in the x-axis and z-axis directions.

The drive electrodes 71 to 73 are constructed as elongated flat plates having plate springs that are thin in the z-axis direction, and protrude horizontally towards the center of the movable member 64 from the drive electrode securing sections 70 disposed at the front and back surfaces. These protruding ends are flexibly deformable in the z-axis direction (plate thickness direction) by being pushed and moved by the movable electrode 66.

The drive electrodes 71 and 73 oppose the movable electrode 66 with a gap therebetween in the z-axis direction (that is, the direction in which the movable member 64 is displaced).

Figure 19:
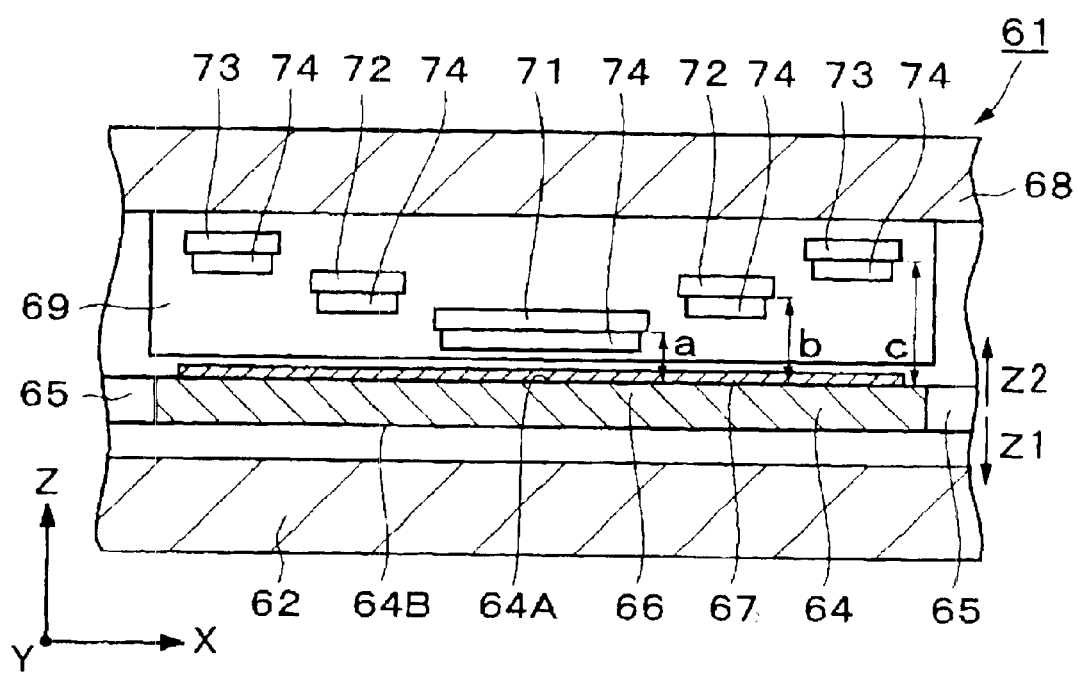
FIG. 19 is an enlarged sectional view of a main portion including a movable member and drive electrodes shown in FIG. 16.

When the actuator 61 is not operating, as shown in FIG. 19, much as in the first preferred embodiment, the gaps between the middle drive electrodes 71 and the movable electrode 66 are previously set with predetermined sizes a, the gaps between the drive electrodes 72 and the movable electrode 66 are set with sizes b, which are, for example, twice the gap sizes a, and the gaps between the drive electrodes 73 and the movable electrode 66 are previously set with sizes c, which are three times the gap sizes a. Therefore, these gap sizes are set so that the sizes b and a become successively smaller from the largest gap sizes c.

The stoppers 74 protrude from the respective drive electrode securing sections 70 at locations adjacent to the respective drive electrodes 71 to 73. When the actuator 61 is not operating, the stoppers 74 are in contact with the back surfaces of the respective drive electrodes 71 to 73 facing the movable member 64. The stoppers 74 restrict the displacement of the drive electrodes 71 to 73 in the direction of arrow z1 shown in FIG. 19 towards the movable electrode 66 from where the drive electrodes 71 to 73 are positioned when the actuator 61 is not operating, and allow the drive electrodes 71 to 73 to be pushed and moved in the direction of arrow z2 by the movable electrode 66.

The electrostatic actuator 61 of the fifth preferred embodiment has the above-described structure. Next, the operation thereof will be described.

First, as shown in FIG. 19, when a voltage is applied between the movable electrode 66 and the drive electrodes 71 to 73, the movable electrode 66 is first attracted to the middle drive electrodes 71 by electrostatic forces. Therefore, the movable member 64 is displaced in the direction of arrow z2 by an amount that corresponds to the gap sizes a between the electrode 66 and the electrodes 71. Then, through the insulating layer 67, the movable electrode 66 comes into contact with the drive electrodes 71 which are displaced in the direction of arrow z1 is restricted by the stoppers 74.

Figure 20:
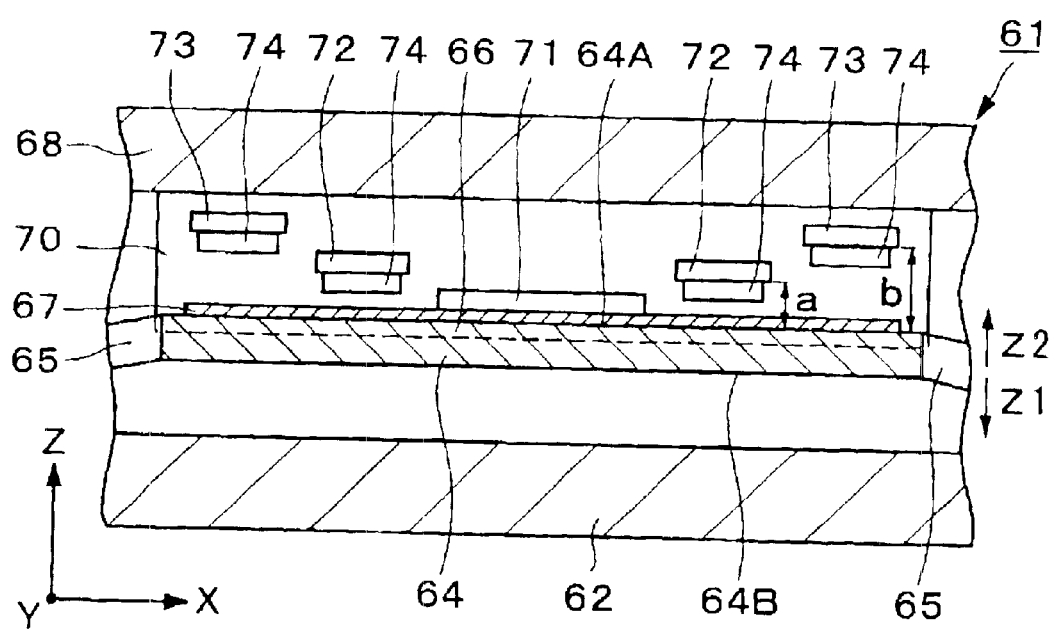
FIG. 20 is an enlarged sectional view of the main portion in which the movable member has been displaced partially.
Figure 21:
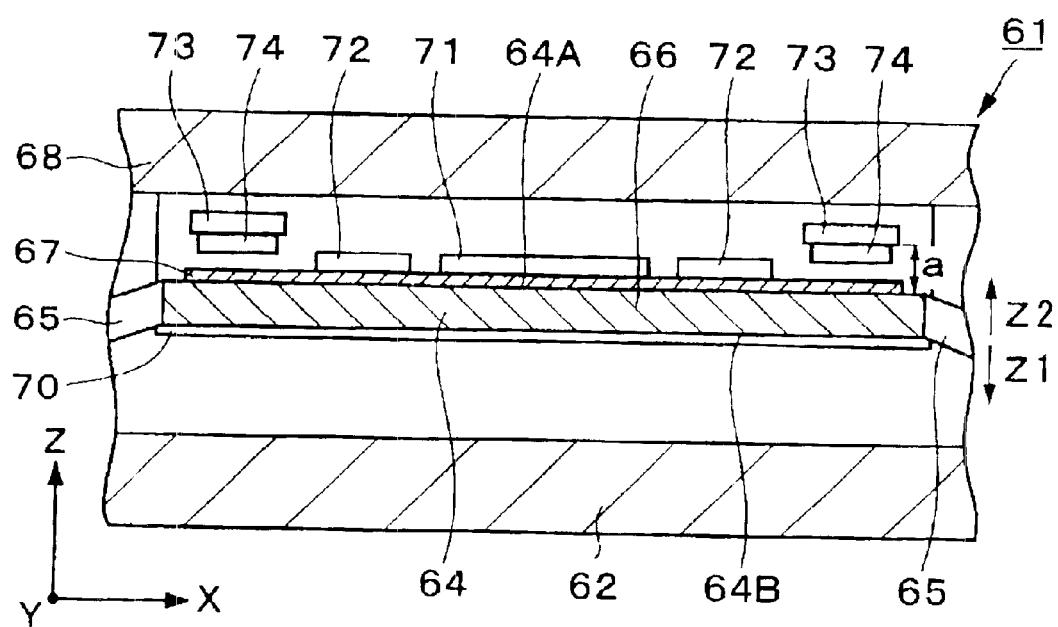
FIG. 21 is an enlarged sectional view of the main portion in which the movable member which has been further displaced.
Figure 22:
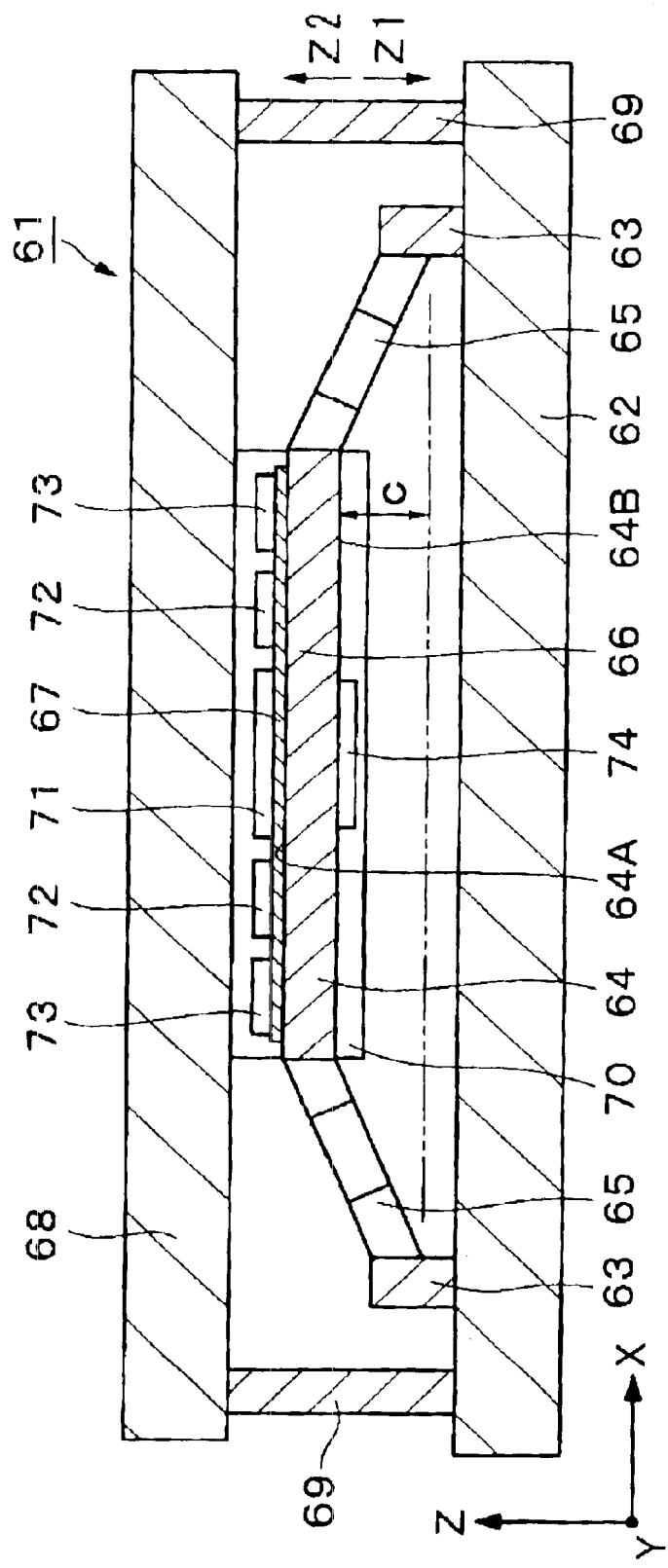
FIG. 22 is a vertical sectional view showing a state in which the movable member has been maximally displaced.

With this structure, the gap sizes between the movable electrode 66 and the drive electrodes 72 are reduced to gap sizes a as shown in FIG. 20, and the movable electrode 66 is attracted to the drive electrodes 72 by electrostatic forces. Therefore, as shown in FIG. 21, the movable member 64 is further driven in the direction of arrow z2 by an amount that corresponds to the gap sizes a between the electrode 66 and the electrodes 72. At this time, the middle electrodes 71 are flexed and deformed with respect to the drive electrode securing sections 70 by being pushed and moved by the movable electrode 66, so that the electrodes 66 and 72 are displaced together in the direction of arrow z2 away from the stoppers 74.

As a result, the gap sizes between the movable electrode 66 and the drive electrodes 73 are reduced to gap sizes a, and an electrostatic force is produced therebetween. Therefore, the movable member 64 is further displaced in the direction of arrow z2 by an amount that corresponds to the gap sizes a between the electrode 66 and the electrodes 73 while it flexes and deforms the drive electrodes 71 and the drive electrodes 72. Therefore, the movable member 64 can be greatly displaced in the vertical direction by an amount that corresponds to the gap size c from where it is positioned when the actuator 1 is not operating, which is indicated by alternate long and two short dashes in FIG. 22, to its maximally displaced position, which is indicated by a solid line in FIG. 22.

Accordingly, even the actuator 61 of the fifth preferred embodiment having such a structure can provide substantially the same operational advantages as those that are provided by the first and fourth preferred embodiments. In particular, in the fifth preferred embodiment, since the movable electrode 66 and the drive electrodes 71 to 73 oppose each other with gaps of sizes a, b, and c therebetween in the z-axis direction, the movable member 64 can be greatly displaced in a direction that is substantially perpendicular to the substrate 62 in the z-axis direction. Therefore, for example, a variable capacitor having large changes in the amount of electrostatic capacitance can be easily provided. In addition, since the movable electrode 66 can be formed using a surface portion of the movable member 64, the structure and the process of forming the movable electrode 66 is greatly simplified.

Figure 23:
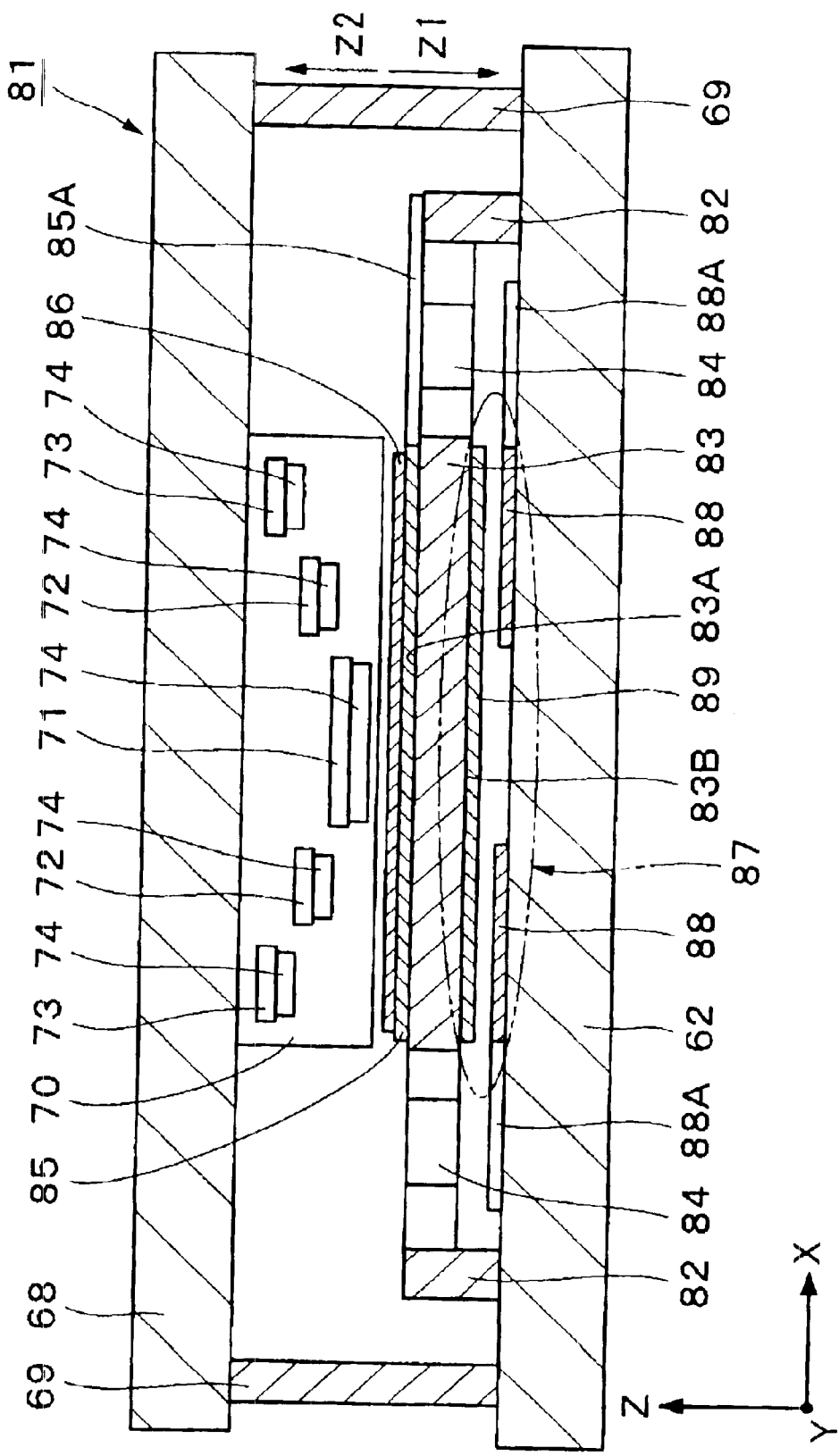
FIG. 23 is a vertical sectional view of a sixth preferred embodiment of an electrostatic actuator of a preferred embodiment of the present invention as seen from the position from which the electrostatic actuator shown in FIG. 17 is seen.

FIG. 23 illustrates a sixth preferred embodiment of the present invention. The special feature of the sixth preferred embodiment is a structure including a variable capacitor between a substrate and a movable member. Component elements of an actuator of the sixth preferred embodiment corresponding to those of the actuator of the fifth preferred embodiment are given the same reference numerals and will not be described below.

Much as in the fifth preferred embodiment, an electrostatic actuator 81 of the sixth preferred embodiment includes a substrate 62, a drive electrode mounting plate 68, a drive electrode securing section 70, drive electrodes 71 to 73, stoppers 74, movable member securing sections 82, a movable member 83, and a movable connection beam 84. The left and right movable member securing sections 82 and the movable connection beams 84 support the movable member 83 at the both the left and right sides thereof so that it can be displaced in the z-axis direction.

The movable member securing sections 82, the movable member 83, the movable connection beam 84, etc., are preferably formed of, for example, an insulating dielectric material such as a silicon material having high resistance. A movable electrode 85 (described later) is provided on a front surface 83A of the movable member 83, and a variable capacitor 87 (described later) is provided on a back surface 83B of the movable member 83.

The movable electrode 85, which is provided on the front surface 83A of the movable member 83, is formed by processing, such as etching, a metallic film formed of, for example, aluminum, gold, chromium, or titanium, or other suitable material. Using the metallic film, it is connected to the outside through a wiring section 85A that is provided on the movable member securing sections 82 and the movable connection beam 84.

An insulating film 86 is provided at the side of the front surface 83A of the movable member 83, and the movable electrode 85 opposes the drive electrodes 71 to 73 through the insulating film 86. Much as in the fifth preferred embodiment, in the actuator 81, the movable member 83 is greatly displaced vertically by applying a voltage between the movable electrode 85 and the drive electrodes 71 to 73.

The variable capacitor 87 is provided between the substrate 62 and the back surface 83B of the movable member 83, and includes two substrate-side electrodes 88 and a movable-member-side electrode 89. The electrodes 88 are disposed on the front surface of the substrate 62 so as to be separated from each other by a gap and are connected to the outside through respective wiring sections 88A, etc. The electrode 89 is disposed on the back surface 83B of the movable member 83 and opposes the electrodes 88.

The electrodes 88 define two parallel plate capacitors connected in series through the electrode 89. The electrostatic capacitances of the electrodes 88, 89 change in accordance with the gap between the electrodes 88 and the electrode 89 when the movable member 83 is displaced in the z-axis direction.

Accordingly, even the actuator 81 of the sixth preferred embodiment having such a structure can provide substantially the same operational advantages as those that are provided by the first and fifth preferred embodiments. In particular, in the sixth preferred embodiment, since the movable member 83 can be greatly displaced in the z-axis direction with respect to the substrate 62, the electrostatic capacitance of the variable capacitor 87 can be changed over a wide range in accordance with the gap between the movable member 83 and the substrate 62, thereby making it possible to easily provide a variable capacitor having high performance. By forming the substrate 62 and the movable member 83 using, for example, a material having a small dielectric loss at a high-frequency region of, for example, an extremely high frequency wave, a low-loss variable capacitor having a high Q value can be realized.

Although, in each of the preferred embodiments, the actuator includes, for example, two sets of three drive electrodes 14 to 16 (or 50 to 52, or 71 to 73), the number of drive electrodes in the present invention is not limited thereto, so that it may include, for example, sets of two or four or more drive electrodes as well as movable electrodes corresponding thereto.

In this case, in the first preferred embodiment, when, for example, two drive electrodes are used, one drive electrode supporting section is connected to a drive electrode securing section, and the drive electrodes are provided at the drive electrode securing section and the drive electrode supporting section, respectively.

Although, in the preferred embodiments described above, the insulating films 17, 53, 67, and 86 are provided as insulating sections, the present invention is not limited thereto. For example, insulating protrusions for preventing the movable electrodes and the drive electrodes from coming into direct contact with each other may be provided.

Although, in the fourth to sixth preferred embodiments, stoppers 54 and stoppers 74 for the respective drive electrodes 50 to 52 and 71 to 73 are provided, the present invention is not limited thereto. These stoppers 54 and stoppers 74 may be omitted.

Although, in the fourth preferred embodiment, the movable member 44 is preferably supported in a cantilever manner, and, in the fifth and sixth preferred embodiments, the movable members 64 and 83 are supported at both sides, the present invention is not limited thereto. In the fourth preferred embodiment, the movable member may be supported at both sides, and, in the fifth and sixth preferred embodiments, the movable members 64 and 83 may be supported in a cantilever manner.

As described in detail above, according to preferred embodiments of the present invention, the actuator is constructed so that one or a plurality of drive electrode supporting sections which are connected to a drive electrode securing section through a driving connection beam or beams so that one or the plurality of drive electrodes can move towards and away from the drive electrode securing section are disposed at the substrate, with drive electrodes and movable electrodes opposing each other. Therefore, the movable member can be successively driven by production of electrostatic forces between a plurality of sets of the movable electrodes and the drive electrodes. Here, the drive electrodes can be displaced with the movable member by the driving connection beam or beams, etc. Therefore, even if, for example, the voltage of the driving power supply is not made particularly large, the amounts by which the movable member is displaced by the plurality of sets of electrodes are added together, so that the movable member can be greatly displaced. In addition, since the movable member can be constructed in an integral structural member, the rigidity and the resonance frequency of the movable member can be easily increased, so that the movement of the movable member can be stabilized and the scope of application and range of use of the actuator can be increased.

According to preferred embodiments of the present invention, since the actuator is constructed so that a plurality of drive electrodes which oppose movable electrodes at a movable member and which are flexed and deformed in the direction in which the movable member is displaced are provided at a drive electrode securing section, the movable member can be successively driven and greatly displaced by a plurality of sets of the movable electrodes and the drive electrodes. Here, since the drive electrodes can be displaced with the movable member as a result of only being flexed and deformed, the structure for supporting the drive electrodes can be simplified. In addition, since the movable member can be constructed in an integral structural member, the rigidity and the resonance frequency of the movable member can be easily increased, so that the movement of the movable member can be stabilized.

According to preferred embodiments of the present invention, since the actuator is constructed so that the sizes of the gaps between the movable electrodes and the respective drive electrodes become successively smaller, it is possible to, for example, make the gap size between one set of electrodes small, and the gap size between the other sets of electrodes larger than the largest gap size between electrodes that allows production of electrostatic forces. In addition, since the movable member can be successively driven in accordance with these gap sizes, the amount of displacement of the movable member can be set at a large value.

According to preferred embodiments of the present invention, since the actuator is constructed so that stoppers for the drive electrodes are provided at the substrate, it is possible to prevent a reduction in the amount of displacement of the movable member when the drive electrodes are displaced towards the movable electrodes by electrostatic forces. In addition, the drive electrodes can move away from the respective stoppers by being pushed and moved by the respective movable electrodes, so that they can be displaced with the movable member.

According to preferred embodiments of the present invention, since the actuator is constructed so that the movable member securing section and the movable connection beam or beams define a cantilever beam structure, the movable member can be supported at one side thereof by the movable member securing section and the movable connection beam or beams, so that the structure for supporting the movable member can be simplified.

According to preferred embodiments of the present invention, since the actuator is constructed so that movable member securing sections and the movable connection beams define a beam structure for supporting both sides of the movable member, the movable member can be stably supported at both sides by two sets of the movable member securing sections and the movable connection beams, so that the movable member can be prevented from tilting in the horizontal direction or vertical direction.

According to preferred embodiments of the present invention, since the actuator is constructed so that the movable member is displaced horizontally along the substrate, the movable member can be greatly displaced horizontally, so that the actuator can be reduced in size in the vertical direction.

According to preferred embodiments of the present invention, since the actuator is constructed so that a movable member which can be displaced vertically is disposed on a substrate, and a plurality of drive electrodes which oppose a movable electrode with vertical gaps therebetween and which are flexed and deformed in the vertical direction are disposed at a drive electrode mounting member, the movable member can be successively driven and greatly displaced in the vertical direction by a plurality of sets of the movable electrode and the drive electrodes. Here, since the drive electrodes can be displaced with the movable member as a result of only being flexed and deformed, for example, the structure for supporting the drive electrodes can be greatly simplified. In addition, since the movable member can be disposed in an integral structural member, the rigidity and the resonance frequency of the movable member can be easily increased, so that the movement of the movable member can be stabilized.

According to preferred embodiments of the present invention, since the actuator is constructed so that the movable electrode is defined by a portion of the movable member formed of a conductive material, the structure of the movable electrode and the steps for forming the movable electrode is greatly simplified.

According to preferred embodiments of the present invention, since the actuator is constructed so that the movable electrode is provided on the front surface of the movable member formed of an insulating material, and a variable capacitor is provided between the substrate and the back surface of the movable member, the electrostatic actuator defines a variable capacitor. In addition, since the movable member is greatly displaced in a direction that is substantially perpendicular to the substrate, the electrostatic capacitance of the variable capacitor can be easily changed over a wide range, so that the performance of the actuator as a variable capacitor is increased.

According to preferred embodiments of the present invention, since the actuator is constructed so that the gap sizes between the movable electrode and the drive electrodes are set successively smaller, even when, for example, the gap size between some of the electrodes is larger than the maximum gap size between electrodes that allows electrostatic force to be produced, it is possible to successively drive the movable member from the side of the electrodes that are separated by the smallest gap, so that the movable member can be greatly displaced.

According to preferred embodiments of the present invention, since the actuator is constructed so that stoppers for the drive electrodes are provided at a drive electrode supporting section, it is possible to prevent a reduction in the amount by which the movable member is displaced when the drive electrodes attract the movable electrode. In addition, the drive electrodes can be displaced with the movable member by being pushed and moved by the movable electrode.

According to preferred embodiments of the present invention, since the actuator is constructed so that movable member securing sections and movable connection beams define a beam structure which supports both sides of the movable member, the movable member can be held horizontally by two sets of the movable member securing sections and the movable connection beams, so that the movable member in this state can be stably displaced in the vertical direction.

According to preferred embodiments of the present invention, since the actuator is constructed so that an insulating section is provided between the movable electrode and the driving electrodes, it is possible to reliably prevent a short circuit from occurring between the movable electrode and the drive electrodes that are attracted towards each other by electrostatic force.

It should be understood that the foregoing description is only illustrative of the present invention. Various alternatives and modifications can be devised by those skilled in the art without departing from the present invention. Accordingly, the present invention is intended to embrace all such alternatives, modifications and variances which fall within the scope of the appended claims.

What is claimed is:

1. An electrostatic actuator comprising:
   a substrate which extends in a horizontal direction;
   a movable member securing section disposed at the substrate;
   a movable member having a front surface and a back surface, with the back surface of the movable member opposing the substrate with a gap therebetween extending in a vertical direction;
   a movable connection beam which connects the movable member to the movable member securing section so that the movable member is displaceable in the vertical direction;
   a movable electrode disposed on the front surface of the movable member;
   a drive electrode mounting member mounted to the substrate and disposed at the front surface side of the movable member;
   a drive electrode securing section disposed at the drive electrode mounting member; and
   a plurality of drive electrodes disposed at the drive electrode securing section so as to be deformable by flexing in the vertical direction, the plurality of drive electrodes opposing the movable electrode with gaps therebetween in the vertical direction.

2. An electrostatic actuator according to claim 1, wherein the movable member is made of a conductive material, and the movable electrode is defined by a portion of the movable member.

3. An electrostatic actuator according to claim 1, wherein the movable member is made of an insulating material, the movable electrode is disposed on the front surface of the movable member, a variable capacitor is disposed between the substrate and the back surface of the movable member, and electrostatic capacitance of the variable capacitor changes in accordance with the amount of displacement of the movable member in the vertical direction.

4. An electrostatic actuator according to claim 1, wherein the sizes of the gaps between the movable electrode and the drive electrodes are set to be successively smaller.

5. An electrostatic actuator according to claim 1, further comprising stoppers, disposed at the drive electrode mounting member, for restricting the displacement of the drive electrodes towards the movable electrode and for allowing the drive electrodes to be pushed and moved by the movable electrode.

6. An electrostatic actuator according to claim 1, wherein the movable member is supported at both sides thereof by the movable member securing section through the movable connection beam.

* * * * *